US008352449B1

(12) United States Patent
Parekh et al.

(10) Patent No.: US 8,352,449 B1
(45) Date of Patent: Jan. 8, 2013

(54) READER DEVICE CONTENT INDEXING

(75) Inventors: Jateen P. Parekh, San Francisco, CA (US); Gregg E. Zehr, Los Gatos, CA (US); Subram Narasimhan, Saratoga, CA (US)

(73) Assignee: Amazon Technologies, Inc., Reno, NV (US)

( * ) Notice: Subject to any disclaimer, the term of this patent is extended or adjusted under 35 U.S.C. 154(b) by 921 days.

(21) Appl. No.: 11/277,894

(22) Filed: Mar. 29, 2006

(51) Int. Cl.
*G06F 17/30* (2006.01)
*G06F 7/00* (2006.01)

(52) U.S. Cl. ......... 707/705; 707/715; 707/741; 707/812

(58) Field of Classification Search .................. None
See application file for complete search history.

(56) References Cited

U.S. PATENT DOCUMENTS

| | | |
|---|---|---|
| 4,622,627 A | 11/1986 | Rodriguez et al. |
| 5,544,305 A | 8/1996 | Ohmaye et al. |
| 5,566,098 A | 10/1996 | Lucente et al. |
| 5,623,260 A | 4/1997 | Jones |
| 5,659,742 A | 8/1997 | Beattie et al. |
| 5,663,748 A | 9/1997 | Huffman et al. |
| 5,710,922 A | 1/1998 | Alley et al. |
| 5,711,922 A | 1/1998 | O'Brien et al. |
| 5,742,905 A | 4/1998 | Pepe et al. |
| 5,761,485 A * | 6/1998 | Munyan ................ 715/839 |
| 5,765,168 A | 6/1998 | Burrows |
| 5,813,017 A | 9/1998 | Morris |
| 5,845,278 A | 12/1998 | Kirsch et al. |
| 5,847,698 A | 12/1998 | Reavey et al. |
| 5,892,900 A | 4/1999 | Ginter et al. |
| 5,940,846 A | 8/1999 | Akiyama |
| 5,956,048 A * | 9/1999 | Gaston ................... 345/530 |
| 5,960,411 A | 9/1999 | Hartman et al. |
| 5,973,681 A | 10/1999 | Tanigawa et al. |
| 6,018,575 A | 1/2000 | Gross et al. |
| 6,034,839 A | 3/2000 | Hamming |
| 6,037,954 A | 3/2000 | McMahon |
| 6,041,335 A | 3/2000 | Merritt et al. |
| 6,049,796 A | 4/2000 | Siitonen et al. |
| 6,064,980 A | 5/2000 | Jacobi et al. |
| 6,073,148 A | 6/2000 | Rowe et al. |

(Continued)

FOREIGN PATENT DOCUMENTS

CN 101120358 2/2008

(Continued)

OTHER PUBLICATIONS

Cavanaugh "EBooks and Accommodations", Teaching Exceptional Children vol. 35, No. 2, pp. 56-61 copyright 2002 CEC.*

(Continued)

*Primary Examiner* — Kuen S Lu
*Assistant Examiner* — Berhanu Mitiku
(74) *Attorney, Agent, or Firm* — Lee & Hayes, PLLC

(57) ABSTRACT

A reader device and method for operating a reader device include content indexing features designed to make the use of a reader device more satisfying. A plurality of indexes is stored on a reader device. One of the indexes stored in the reader device is also stored at a remote site. Several indexes stored at the remote site may be substantially similar to one or more of the indexes stored on a reader device. The indexes stored at the remote site may be used to update one or more indexes stored on a reader device. In one implementation, the reader device is an electronic book ("eBook") reader device.

35 Claims, 11 Drawing Sheets

U.S. PATENT DOCUMENTS

| | | |
|---|---|---|
| 6,148,340 A | 11/2000 | Bittinger et al. |
| 6,154,757 A | 11/2000 | Krause et al. |
| 6,164,974 A | 12/2000 | Carlile et al. |
| 6,201,771 B1 | 3/2001 | Otsuka et al. |
| 6,233,318 B1 | 5/2001 | Picard et al. |
| 6,300,947 B1 | 10/2001 | Kanevsky |
| 6,308,320 B1 | 10/2001 | Burch |
| 6,313,828 B1 | 11/2001 | Chombo |
| 6,331,867 B1 | 12/2001 | Eberhard et al. |
| 6,335,678 B1 | 1/2002 | Heutschi |
| 6,351,750 B1 | 2/2002 | Duga et al. |
| 6,385,596 B1 | 5/2002 | Wiser et al. |
| 6,401,086 B1 | 6/2002 | Bruckner |
| 6,401,239 B1 | 6/2002 | Miron |
| 6,442,651 B2 | 8/2002 | Crow et al. |
| 6,449,627 B1 | 9/2002 | Baer et al. |
| 6,457,030 B1 | 9/2002 | Adams et al. |
| 6,466,951 B1 | 10/2002 | Birkler et al. |
| 6,493,734 B1 | 12/2002 | Sachs et al. |
| 6,496,803 B1 | 12/2002 | Seet et al. |
| 6,529,920 B1 | 3/2003 | Arons et al. |
| 6,542,874 B1 | 4/2003 | Walker et al. |
| 6,560,699 B1 | 5/2003 | Konkle |
| 6,642,947 B2 | 11/2003 | Feierbach |
| 6,658,623 B1 | 12/2003 | Schilit et al. |
| 6,685,482 B2 | 2/2004 | Hopp et al. |
| 6,687,878 B1 | 2/2004 | Eintracht et al. |
| 6,704,733 B2 | 3/2004 | Clark et al. |
| 6,721,869 B1 | 4/2004 | Senthil |
| 6,724,403 B1 | 4/2004 | Santoro et al. |
| 6,725,227 B1 | 4/2004 | Li |
| 6,735,583 B1 | 5/2004 | Bjarnestam et al. |
| 6,744,891 B1 | 6/2004 | Allen |
| 6,847,966 B1 | 1/2005 | Sommer et al. |
| 6,904,449 B1 | 6/2005 | Quinones |
| 6,912,398 B1 | 6/2005 | Domnitz |
| 6,933,928 B1 | 8/2005 | Lilienthal |
| 6,938,076 B2 | 8/2005 | Meyer et al. |
| 6,985,932 B1 | 1/2006 | Glaser et al. |
| 6,999,565 B1 | 2/2006 | Delaney et al. |
| 7,007,015 B1 | 2/2006 | Nayak |
| 7,009,596 B2 | 3/2006 | Seet et al. |
| 7,010,500 B2 | 3/2006 | Aarnio |
| 7,020,654 B1 | 3/2006 | Najmi |
| 7,054,914 B2 | 5/2006 | Suzuki et al. |
| 7,057,591 B1 | 6/2006 | Hautanen et al. |
| 7,062,707 B1 | 6/2006 | Knauft et al. |
| 7,092,116 B2 | 8/2006 | Calaway |
| 7,103,848 B2 | 9/2006 | Barsness et al. |
| 7,107,533 B2 | 9/2006 | Duncan et al. |
| 7,130,841 B1 | 10/2006 | Goel et al. |
| 7,133,506 B1 | 11/2006 | Smith |
| 7,135,932 B2 | 11/2006 | Quadir et al. |
| 7,149,776 B1 | 12/2006 | Roy et al. |
| 7,165,217 B1 | 1/2007 | Kondo |
| 7,188,085 B2 | 3/2007 | Pelletier |
| 7,209,888 B2 | 4/2007 | Frid-Nielsen et al. |
| 7,237,123 B2 | 6/2007 | LeVine et al. |
| 7,246,118 B2 | 7/2007 | Chastain et al. |
| 7,249,060 B2 | 7/2007 | Ling |
| 7,249,324 B2 | 7/2007 | Nakamura et al. |
| 7,257,577 B2 * | 8/2007 | Fagin et al. ........................ 707/7 |
| 7,287,068 B1 | 10/2007 | Eriksson et al. |
| 7,290,285 B2 | 10/2007 | McCurdy et al. |
| 7,298,851 B1 | 11/2007 | Hendricks et al. |
| 7,304,635 B2 | 12/2007 | Seet et al. |
| 7,310,629 B1 | 12/2007 | Mendelson et al. |
| 7,313,759 B2 | 12/2007 | Sinisi |
| 7,350,704 B2 | 4/2008 | Barsness et al. |
| 7,355,591 B2 * | 4/2008 | Sugimoto ..................... 345/169 |
| 7,386,480 B2 | 6/2008 | Sarig |
| 7,398,244 B1 | 7/2008 | Keith |
| 7,401,286 B1 * | 7/2008 | Hendricks et al. ............ 715/203 |
| 7,454,238 B2 | 11/2008 | Vinayak et al. |
| 7,496,767 B2 | 2/2009 | Evans |
| 7,506,246 B2 | 3/2009 | Hollander et al. |
| 7,509,270 B1 | 3/2009 | Hendricks et al. |
| 7,533,152 B2 | 5/2009 | Stark et al. |
| 7,539,478 B2 | 5/2009 | Herley et al. |
| 7,562,032 B2 | 7/2009 | Abbosh et al. |
| 7,574,653 B2 | 8/2009 | Croney et al. |
| 7,631,013 B2 | 12/2009 | Parsons et al. |
| 7,634,429 B2 | 12/2009 | Narin et al. |
| 7,656,127 B1 | 2/2010 | Shutt et al. |
| 7,657,459 B2 | 2/2010 | Anderson et al. |
| 7,657,831 B2 | 2/2010 | Donahue |
| 7,680,849 B2 | 3/2010 | Heller et al. |
| 7,720,892 B1 | 5/2010 | Healey, Jr. et al. |
| 7,760,986 B2 | 7/2010 | Beuque |
| 7,788,369 B2 | 8/2010 | McAllen et al. |
| 7,792,756 B2 | 9/2010 | Plastina et al. |
| 7,835,989 B1 | 11/2010 | Hendricks et al. |
| 7,849,393 B1 | 12/2010 | Hendricks et al. |
| 7,865,405 B2 | 1/2011 | Hendricks et al. |
| 7,865,567 B1 | 1/2011 | Hendricks et al. |
| 7,870,022 B2 | 1/2011 | Bous et al. |
| 7,900,133 B2 | 3/2011 | Cragun et al. |
| 7,908,628 B2 | 3/2011 | Swart et al. |
| 8,131,647 B2 | 3/2012 | Siegel et al. |
| 8,165,998 B2 | 4/2012 | Semerdzhiev |
| 2001/0007980 A1 * | 7/2001 | Ishibashi et al. ................ 705/26 |
| 2001/0025302 A1 | 9/2001 | Suzuki et al. |
| 2001/0027450 A1 | 10/2001 | Shinoda et al. |
| 2001/0027478 A1 | 10/2001 | Meier et al. |
| 2001/0037328 A1 | 11/2001 | Pustejovsky et al. |
| 2001/0049623 A1 | 12/2001 | Aggarwal et al. |
| 2001/0053975 A1 | 12/2001 | Kurihara |
| 2002/0002540 A1 | 1/2002 | DeMello et al. |
| 2002/0010707 A1 | 1/2002 | Chang et al. |
| 2002/0010759 A1 | 1/2002 | Hitson et al. |
| 2002/0012134 A1 | 1/2002 | Calaway |
| 2002/0035697 A1 * | 3/2002 | McCurdy et al. ............. 713/200 |
| 2002/0054059 A1 | 5/2002 | Schneiderman |
| 2002/0069222 A1 | 6/2002 | McNeely |
| 2002/0069312 A1 | 6/2002 | Jones |
| 2002/0090934 A1 | 7/2002 | Mitchelmore |
| 2002/0091584 A1 | 7/2002 | Clark et al. |
| 2002/0092031 A1 | 7/2002 | Dudkiewicz et al. |
| 2002/0101447 A1 | 8/2002 | Carro |
| 2002/0103809 A1 | 8/2002 | Starzl et al. |
| 2002/0120635 A1 | 8/2002 | Joao |
| 2002/0123336 A1 | 9/2002 | Kamada |
| 2002/0129012 A1 | 9/2002 | Green |
| 2002/0138291 A1 | 9/2002 | Vaidyanathan et al. |
| 2002/0143822 A1 | 10/2002 | Brid et al. |
| 2002/0147724 A1 | 10/2002 | Fries et al. |
| 2002/0184319 A1 | 12/2002 | Willner et al. |
| 2002/0194474 A1 | 12/2002 | Natsuno et al. |
| 2003/0009459 A1 | 1/2003 | Chastain et al. |
| 2003/0018720 A1 | 1/2003 | Chang et al. |
| 2003/0025731 A1 | 2/2003 | Chastain et al. |
| 2003/0028395 A1 | 2/2003 | Rodgers et al. |
| 2003/0040970 A1 | 2/2003 | Miller |
| 2003/0052928 A1 | 3/2003 | Williams |
| 2003/0058265 A1 | 3/2003 | Robinson et al. |
| 2003/0065642 A1 | 4/2003 | Zee |
| 2003/0069812 A1 * | 4/2003 | Yuen et al. ...................... 705/27 |
| 2003/0093312 A1 | 5/2003 | Ukita et al. |
| 2003/0093382 A1 | 5/2003 | Himeno et al. |
| 2003/0097354 A1 * | 5/2003 | Finlay et al. ....................... 707/2 |
| 2003/0105679 A1 * | 6/2003 | Krishnan et al. ................ 705/27 |
| 2003/0110503 A1 | 6/2003 | Perkes |
| 2003/0129963 A1 | 7/2003 | Nurcahya |
| 2003/0135495 A1 | 7/2003 | Vagnozzi |
| 2003/0152894 A1 | 8/2003 | Townshend |
| 2003/0163399 A1 | 8/2003 | Harper et al. |
| 2003/0164844 A1 | 9/2003 | Kravitz et al. |
| 2003/0182551 A1 | 9/2003 | Frantz et al. |
| 2003/0190145 A1 | 10/2003 | Copperman et al. |
| 2003/0191737 A1 | 10/2003 | Steele et al. |
| 2003/0204496 A1 | 10/2003 | Ray et al. |
| 2003/0212613 A1 | 11/2003 | Sarig |
| 2004/0002943 A1 | 1/2004 | Merrill et al. |
| 2004/0003398 A1 | 1/2004 | Donian et al. |
| 2004/0015467 A1 | 1/2004 | Fano |
| 2004/0030686 A1 | 2/2004 | Cardno et al. |
| 2004/0044723 A1 | 3/2004 | Bell et al. |

| | | |
|---|---|---|
| 2004/0054499 A1 | 3/2004 | Starzyk et al. |
| 2004/0098350 A1 | 5/2004 | Labrou et al. |
| 2004/0117189 A1 | 6/2004 | Bennett |
| 2004/0120280 A1 | 6/2004 | Western |
| 2004/0128359 A1 | 7/2004 | Horvitz et al. |
| 2004/0139400 A1 | 7/2004 | Allam et al. |
| 2004/0167822 A1 | 8/2004 | Chasen et al. |
| 2004/0201633 A1 | 10/2004 | Barsness et al. |
| 2004/0205457 A1 | 10/2004 | Bent et al. |
| 2004/0212941 A1 | 10/2004 | Haas et al. |
| 2004/0237033 A1 | 11/2004 | Woolf et al. |
| 2004/0243613 A1 | 12/2004 | Pourheidari |
| 2004/0267552 A1 | 12/2004 | Gilliam et al. |
| 2004/0268253 A1 | 12/2004 | DeMello et al. |
| 2005/0021464 A1 | 1/2005 | Lindauer et al. |
| 2005/0022113 A1 | 1/2005 | Hanlon |
| 2005/0044148 A1 | 2/2005 | Son et al. |
| 2005/0044224 A1 | 2/2005 | Jun et al. |
| 2005/0066219 A1 | 3/2005 | Hoffman et al. |
| 2005/0069225 A1 | 3/2005 | Schneider et al. |
| 2005/0088410 A1 | 4/2005 | Chaudhri |
| 2005/0102618 A1 | 5/2005 | Naito |
| 2005/0125222 A1 | 6/2005 | Brown et al. |
| 2005/0138007 A1 | 6/2005 | Amitay |
| 2005/0138428 A1 | 6/2005 | McAllen et al. |
| 2005/0144895 A1 | 7/2005 | Grimes et al. |
| 2005/0176438 A1 | 8/2005 | Li |
| 2005/0177567 A1 | 8/2005 | Hughes et al. |
| 2005/0193330 A1 | 9/2005 | Peters |
| 2005/0195975 A1 | 9/2005 | Kawakita |
| 2005/0198070 A1 | 9/2005 | Lowry |
| 2005/0222977 A1 | 10/2005 | Zhou et al. |
| 2005/0250439 A1 | 11/2005 | Leslie |
| 2005/0256822 A1 | 11/2005 | Hollingsworth |
| 2006/0004840 A1 | 1/2006 | Senda |
| 2006/0020469 A1 | 1/2006 | Rast |
| 2006/0031316 A1 | 2/2006 | Forstadius |
| 2006/0047830 A1 | 3/2006 | Nair et al. |
| 2006/0048184 A1 | 3/2006 | Poslinski et al. |
| 2006/0057960 A1 | 3/2006 | Tran |
| 2006/0061595 A1 | 3/2006 | Goede et al. |
| 2006/0071754 A1 | 4/2006 | Tofts et al. |
| 2006/0075205 A1 | 4/2006 | Martin et al. |
| 2006/0080261 A1 | 4/2006 | Christal |
| 2006/0098900 A1 | 5/2006 | King et al. |
| 2006/0101328 A1 | 5/2006 | Albornoz et al. |
| 2006/0123053 A1 | 6/2006 | Scannell, Jr. |
| 2006/0129618 A1 | 6/2006 | Maier |
| 2006/0143558 A1 | 6/2006 | Albornoz et al. |
| 2006/0156222 A1 | 7/2006 | Chi et al. |
| 2006/0161578 A1 | 7/2006 | Siegel et al. |
| 2006/0161635 A1 | 7/2006 | Lamkin et al. |
| 2006/0175983 A1 | 8/2006 | Crouse et al. |
| 2006/0179137 A1 | 8/2006 | Jennings et al. |
| 2006/0190489 A1 | 8/2006 | Vohariwatt et al. |
| 2006/0190568 A1 | 8/2006 | Patterson |
| 2006/0236240 A1 | 10/2006 | Lebow |
| 2006/0250994 A1 | 11/2006 | Sasaki et al. |
| 2006/0253441 A1 | 11/2006 | Nelson |
| 2006/0253461 A1 | 11/2006 | de Bonet |
| 2006/0256083 A1 | 11/2006 | Rosenberg |
| 2006/0265518 A1 | 11/2006 | Owens et al. |
| 2006/0281058 A1 | 12/2006 | Mangoaela |
| 2007/0014404 A1 | 1/2007 | Cha |
| 2007/0039023 A1 | 2/2007 | Kataoka |
| 2007/0050346 A1 | 3/2007 | Goel et al. |
| 2007/0061335 A1 | 3/2007 | Ramer et al. |
| 2007/0073596 A1 | 3/2007 | Alexander et al. |
| 2007/0079383 A1 | 4/2007 | Gopalakrishnan |
| 2007/0094285 A1 | 4/2007 | Agichtein et al. |
| 2007/0094351 A1 | 4/2007 | Kalish et al. |
| 2007/0105536 A1 | 5/2007 | Tingo, Jr. |
| 2007/0112817 A1 | 5/2007 | Danninger |
| 2007/0118533 A1 | 5/2007 | Ramer et al. |
| 2007/0136660 A1 | 6/2007 | Gurcan et al. |
| 2007/0136679 A1 | 6/2007 | Yang |
| 2007/0150456 A1 | 6/2007 | Lian et al. |
| 2007/0174545 A1 | 7/2007 | Okada et al. |
| 2007/0185865 A1 | 8/2007 | Budzik et al. |
| 2007/0189719 A1 | 8/2007 | Furumachi et al. |
| 2007/0219983 A1 | 9/2007 | Fish |
| 2007/0233562 A1 | 10/2007 | Lidwell et al. |
| 2007/0233692 A1 | 10/2007 | Lisa et al. |
| 2007/0234209 A1 | 10/2007 | Williams |
| 2007/0240187 A1* | 10/2007 | Beach et al. .................... 725/53 |
| 2007/0282809 A1 | 12/2007 | Hoeber et al. |
| 2007/0283173 A1 | 12/2007 | Webb et al. |
| 2007/0288853 A1 | 12/2007 | Neil |
| 2008/0005097 A1 | 1/2008 | Kleewein et al. |
| 2008/0005664 A1 | 1/2008 | Chandra |
| 2008/0027933 A1 | 1/2008 | Hussam |
| 2008/0031595 A1 | 2/2008 | Cho |
| 2008/0040233 A1 | 2/2008 | Wildman et al. |
| 2008/0082518 A1 | 4/2008 | Loftesness |
| 2008/0082911 A1 | 4/2008 | Sorotokin et al. |
| 2008/0089665 A1 | 4/2008 | Thambiratnam et al. |
| 2008/0113614 A1 | 5/2008 | Rosenblatt |
| 2008/0120280 A1 | 5/2008 | Iijima et al. |
| 2008/0133479 A1 | 6/2008 | Zelevinsky et al. |
| 2008/0163039 A1 | 7/2008 | Ryan et al. |
| 2008/0164304 A1 | 7/2008 | Narasimhan et al. |
| 2008/0168073 A1 | 7/2008 | Siegel et al. |
| 2008/0208833 A1 | 8/2008 | Basmov |
| 2008/0222552 A1 | 9/2008 | Batarseh et al. |
| 2008/0235351 A1 | 9/2008 | Banga et al. |
| 2008/0243788 A1 | 10/2008 | Reztlaff et al. |
| 2008/0243828 A1 | 10/2008 | Reztlaff et al. |
| 2008/0259057 A1 | 10/2008 | Brons |
| 2008/0293450 A1 | 11/2008 | Ryan et al. |
| 2008/0294674 A1 | 11/2008 | Reztlaff, II et al. |
| 2008/0295039 A1 | 11/2008 | Nguyen et al. |
| 2009/0094528 A1 | 4/2009 | Gray et al. |
| 2009/0094540 A1 | 4/2009 | Gray et al. |
| 2009/0181649 A1 | 7/2009 | Bull et al. |
| 2009/0228774 A1 | 9/2009 | Matheny et al. |
| 2009/0263777 A1 | 10/2009 | Kohn |
| 2009/0319482 A1 | 12/2009 | Norlander et al. |
| 2010/0023259 A1 | 1/2010 | Krumm et al. |
| 2010/0081120 A1 | 4/2010 | Nanjiani et al. |
| 2010/0188327 A1 | 7/2010 | Frid et al. |
| 2012/0041941 A1 | 2/2012 | King et al. |

FOREIGN PATENT DOCUMENTS

| | | |
|---|---|---|
| CN | 101120358 A | 2/2008 |
| EP | 1842150 A2 | 10/2007 |
| JP | 2001100702 A | 4/2001 |
| JP | 2002099739 A | 4/2002 |
| WO | WO9720274 | 6/1997 |
| WO | WO0045588 | 8/2000 |
| WO | WO0056055 A2 | 9/2000 |
| WO | WO0075840 A2 | 12/2000 |
| WO | WO0239206 | 5/2002 |
| WO | WO2004055647 A2 | 7/2004 |
| WO | WO2006078728 A2 | 7/2006 |

OTHER PUBLICATIONS

Chi et al. "eBooks with Indexes that Reorganize Conceptually", CHI 2004, Apr. 24-29, 2004, Vienna, Austria., ACM 1-58113-703-6/04/0004.*

Davison et al. "The Use of eBooks and Interactive Multimedia, as Alternative Forms of Technical Documentation" SIGDOC'05, Sep. 21-23, 2005, Coventry, United Kingdom., Copyright 2005 ACM 1-59593-175-9-05/0009.*

Sohn et al. "Development of a Standard Format for eBooks", SAC 2002, Madrid, Spain, 2002 ACM 1-58113-445-2/02/0.*

"A Universally Unique IDentifier (UUID) URN Namespace", Jul. 2005, IETF, all pages. Retrieved on Apr. 21, 2010 at http://tools.ietf.org/pdf/rfc4122.pdf.

Bellwood, et al., "UDDI Version 2.04 API Specification UDDI Committee Specification, Jul. 19, 2002", Oasis, all pages. Retrieved on Apr. 21, 2010 via Wayback Machine at http://web.archive.org/web/20050314033213/www.oasis-open.org/committees/uddi-spec/doc/tcspecs.htm.

PCT Search Report for PCT Application No. PCT/US10/22060, mailed Mar. 8, 2010 (7 pages).

"Universal Unique Identifier", dated Dec. 16, 2002. The Open Group, all pages. Retrieved on Apr. 21, 2010 via Wayback Machine at http://web.archive.org/web/20021216070918/http://www.opengroup.org/onlinepubs/9629399/apdxa.htm.

"Web Services Architecture: W3C Working Group Note Feb. 11, 2004", Feb. 11, 2004, W3C, all pages. Retrieved on Apr. 21, 2010 via Wayback Machine at http://web.archive.org/web/2004040205185/http://www.w3.org/TR/ws-arch/.

U.S. Appl. No. 11/537,484, filed Sep. 29, 2006, Thomas Ryan, "Expedited Acquisition of a Digital Item Following a Sample Presentation of the Item."

U.S. Appl. No. 11/537,518, filed Sep. 29, 2006, John Lattyak, "Acquisition of an Item based on a Catalog Presentation of Items."

U.S. Appl. No. 11/693,685, filed Mar. 29, 2007, John Lattyak; John Kim; Steven Moy; Laurent An Minh Nguyen, "Relative Progress and Event Indicators."

U.S. Appl. No. 11/763,314, filed Jun. 14, 2007, John Lattyak; Craig Griffin; Steven Weiss, "Display Dependent Markup Language."

U.S. Appl. No. 11/763,339, filed Jun. 14, 2007, David Isbister; Marshall Willilams; Nicholas Vaccaro, "Power Management Techniques for a User Device."

U.S. Appl. No. 11/763,357, filed Jun. 14, 2007, James Reztlaff II; John Lattyak, "Obtaining and Verifying Search Indices."

U.S. Appl. No. 11/763,363, filed Jun. 14, 2007, James Reztlaff II; Thomas Ryan, "Search Results Generation and Sorting."

U.S. Appl. No. 11/763,375, filed Jun. 14, 2007, John Lattyak, Girish Bansil Bajaj, Kevin R. Cheung, Thomas Fruchterman, Robert L. Goodwin, Kenneth P. Kiraly, Richard Moore, Subram Narasimhan, Thomas A. Ryan, Michael V. Rykov, Jon Saxton, James C. Slezak, Beryl Tomay, Aviram Zagorie, Gregg Elliott Zehr, "Delivery of Items for Consumption by a User Device."

U.S. Appl. No. 11/763,376, filed Jun. 14, 2007, Kenneth Kiraly; Thomas Ryan; Gregg Zehr; John Lattyak; Michael Rykov; Girish Bansilal Bajaj; James Slezak; Aviram Zagorie; Richard Moore; Kevin Cheung; Thomas Fruchterman; Robert Goodwin, "Notification of a User Device to Perform an Action."

U.S. Appl. No. 11/763,378, filed Jun. 14, 2007, John Lattyak; Thomas Ryan; Gregg Zehr; Kenneth Kiraly; Michael Rykov; Girish Bansilal Bajaj; James Slezak; Aviram Zagorie; Richard Moore; Kevin Cheung; Thomas Fruchterman; Robert Goodwin; Xiaotian Guo, "Transfer of Instructions to a User Device."

U.S. Appl. No. 11/763,381, filed Jun. 14, 2007, Michael Rykov; Girish Bansilal Bajaj; James Slezak; Aviram Zagorie; Richard Moore; Kevin Cheung; Thomas Fruchterman; Robert Goodwin, "Selecting and Providing Items in a Media Consumption System."

U.S. Appl. No. 11/763,386, filed Jun. 14, 2007, Thomas Ryan; Gregg Zehr; Kenneth Kiraly; John Lattyak; Michael Rykov; Girish Bansilal Bajaj; James Slezak; Aviram Zagorie; Richard Moore; Kevin Cheung; Thomas Fruchterman; Robert Goodwin, "Handling of Subscription-Related Issues in a Media Consumption System."

U.S. Appl. No. 11/763,390, filed Jun. 14, 2007, Girish Bansilal Bajaj; Michael Rykov; James Slezak; Aviram Zagorie; Richard Moore; Kevin Cheung; Thomas Fruchterman; Robert Goodwin,, "Providing User-Supplied Items to a User Device."

U.S. Appl. No. 11/763,392, filed Jun. 14, 2007, Thomas Ryan; Gregg Zehr; Kenneth Kiraly; John Lattyak; Subram Narasimhan; Michael Rykov; Girish Bansilal Bajaj; James Slezak; Aviram Zagorie; Richard Moore; Kevin Cheung; Thomas Fruchterman; Robert Goodwin, "Administrative Tasks in a Media Consumption System."

U.S. Appl. No. 11/763,393, filed Jun. 14, 2007, John Lattyak; Michael Rykov; Girish Bansilal Bajaj; James Slezak; Aviram Zagorie; Richard Moore; Kevin Cheung; Thomas Fruchterman; Robert Goodwin,, "Incremental Updates of Items ."

U.S. Appl. No. 11/763,395, filed Jun. 14, 2007, Thomas Ryan; Gregg Zehr; Kenneth Kiraly; John Lattyak; Michael Rykov; Girish Bansilal Bajaj; James Slezak; Aviram Zagorie; Richard Moore; Kevin Cheung; Thomas Fruchterman; Robert Goodwin; James Reztlaff II, "Providing Supplemental Information Based on Hints in a Media Consumption System."

U.S. Appl. No. 11/963,618, filed Dec. 21, 2007, Michael Rykov; Laurent An Minh Nguyen; Steven Moy, "Dissemination of Periodical Samples."

U.S. Appl. No. 12/333,215, filed Dec. 11, 2008, Aviram Zagorie; Craig Griffin; John Lattyak; Michael Rykov, "Device-Specific Presentation Control for Electronic Book Reader Devices."

U.S. Appl. No. 12/351,629, filed Jan. 9, 2009, John Johnston; Weiping Dou; Steven Chase, "Antenna Placement on Portable Device."

U.S. Appl. No. 12/351,663, filed Jan. 9, 2009, Chris Li; Steven Chase, "Surface Mount Clip for Routing and Grounding Cables."

U.S. Appl. No. 12/360,089, filed Jan. 26, 2009, Thomas Dimson, Janna Hamaker, Eugene Kalenkovich, Tom Killalea, "Aggregation of Highlights."

U.S. Appl. No. 12/360,744, filed Jan. 27, 2009, Rajiv Kotesh Ghanta; Marcos Frid; Joseph J. Hebenstreit; John T. Kim, "Electronic Device With Haptic Feedback."

U.S. Appl. No. 12/366,941, filed Feb. 6, 2009, Scott Dixon; Eriel Thomas, "Bundled Digital Content."

U.S. Appl. No. 12/414,914, filed Mar. 31, 2009, Amit Agarwal; Zaur Kambarov; Tom Killalea, "Questions on Highlighted Passages."

U.S. Appl. No. 29/331,528, filed Jan. 27, 2009, Chris Green, "User Interface Cluster."

Bradley, "Plastic Shape Shifter", retreived on May 7, 2009 at <<http://www.reactivereports.com/61/61_3.html>>, Chemistry WebMagazine, Issue No. 61, Dec. 2006, 2 pgs.

Cleveland, Jr. et al., "Questions and Answers about Biological Effects and Potential Hazards of Radiofrequency Electromagnetic Fields" OET Bulletin 56, Fourth Edition, Aug. 1999, 38 pages.

Elspass, et al., "Portable Haptic Interface with Active Functional Design", in Proceedings SPIE Conference on Smart Structures and Integrated Systems, Newport Beach, California, vol. 3668, Mar. 1999, 926-932.

"Haptic History—Machine Haptics (Expansion)" retrieved on May 7, 2009 at <<http://hapticshistory.chc61.uci.cu/haptic/site/pages/Machine-Haptics-Became_5.php.>> from Google's cache, text-only version as webpage appeared on Apr. 16, 2009, 8 pgs.

Jones, et al., "Development of a Tactile Vest", IEEE Computer Society, in the Proceedings of the 12th International Symposium on Haptic Interfaces for Virtual Environment and Teleoperator Systems, Mar. 27-28, 2004, pp. 82-89.

Leutwyler, "Shape-shifting Polymer Gels", retrieved on May 7, 2009 at <<http://www.scientificamerican.com/article.cfm?id=shape-shifting-polymer-ge&print=true>>, Scientific American, Nov. 9, 2000, 1 pg.

Means, et al., "Evaluating Compliance with FCC Guidelines for Human Exposure to Radiofrequency Electromagnetic Fields", OET Bulletin 65 Edition 97-01, Jun. 2001, 57 pages.

Nakatani, et al., "3D Form Display with Shape Memory Alloy", in Proceedings of 13th International Conference on Artificial Reality and Teleexistence (ICAT), 2003, pp. 179-184.

Oqo "A Full PC That Fits in Your Pocket" Retrieved on Sep. 22, 2008 at <<http://www.oqo.com/support/documentation.html>>, 34 pgs.

"Shape Memory Polymer", retrieved on May 7, 2009 at <<http://en.wikipedia.org/wiki/Shape_Memory_Polymer>>, Wikipedia, 8 pgs.

Wellman, et al., "Mechanical Design and Control of a High-Bandwidth Shape Memory Alloy Tactile Display", Springer-Verlag, in the Proceedings of the International Symposium on Experimental Robotics, Barcelona, Spain, Jun. 1997, pp. 56-66, 12 pgs.

Yoshikawa, et al., "Vertical Drive Micro Actuator for Haptic Display Using Shape Memory Alloy Thin Film", IEE Japan, Papers of Technical Meeting on Micromachine and Sensor System, Journal Code L2898B, vol. MSS-05, No. 21-44, 2005, pp. 103-108.

PCT International Search Report for Application No. PCT/US 07/89105, mailed on Aug. 18, 2008, 4 pgs.

PCT International Search Report for Application No. PCT/US 08/57829, mailed on Aug. 15, 2008, 2 pgs.

PCT International Search Report for Application No. PCT/US 08/64387, mailed on Sep. 9, 2008, 2 pgs.

PCT International Search Report for Application No. PCT/US 08/64368, mailed on Sep. 22, 2008, 2 pgs.

PCT International Search Report for Application No. PCT/US 08/57871, mailed on Nov. 3, 2008, 4 pgs.

PCT International Search Report for Application No. PCT/US 08/57848, mailed on Jul. 7, 2008, 9 pgs.

Cafesoft.com, "Security Glossary", dated Oct. 13, 2003, retrieved from the Wayback Machine on Jul. 2, 2009 at <<http://web.archive.org/web/20031013022218/http://cafesoft.com/support/security-glossary.html>>, 6 pages.

Henke, H. "Survey on Electronic Book Features", Open eBook Forum, online, Mar. 20, 2002, pp. 1-14, retrieved from the internet: <http://www.openebook.org/doc_library/surveys/IDPF_eBook_Features_2002.pdf> retrieved Nov. 8, 2010.

Zobel, J. et al., "Inverted Files for Text Search Engines" ACM Computing Surveys, vol. 38, No. 2, Jul. 1, 2006, pp. 1-56, NY, NY.

Card et al., "3Book: A 3D Electronic Smart Book", AVI'04 May 25-28, 2004, Hallipoli, Italy, ACM 2004, pp. 303-pp. 307.

Japanese Office Action mailed Oct. 25, 2011 for Japanese patent application No. 2007-552235, a counterpart foreign application of U.S. Appl. No. 11/039,645, 3 pages.

Mercier et al., "Sphere of influence Model in Information retrieval", IEEE 2005 International Conference on Fuzzy Systems, pp. 120-25.

Final Office Action for U.S. Appl. No. 11/537,484, mailed on Jan. 24, 2012, Thomas A. Ryan, "Expedited Acquisition of a Digital Item Following a Sample Presentation of the Item", 22 pages.

Final Office Action for U.S. Appl. No. 12/414,914, mailed on Jan. 4, 2012, Agarwal et al., "Questions on Highlighted Passages", 41 pages.

Office action for U.S. Appl. No. 11/763,357, mailed on Dec. 21, 2011, Reztlaff et al., "Obtaining and Verifying Search Indices", 14 pages.

Final Office Action for U.S. Appl. No. 11/763,363, mailed Dec. 23, 2011, James R. Rezlaff II et al., "Search Results Generation and Sorting", 10 pages.

Non-Final Office Action for U.S. Appl. No. 11/763,369, mailed on Dec. 29, 2011, James R. Reztlaff II et al., "Search of Multiple Content Sources on a User Device", 21 pages.

Final Office Action for U.S. Appl. No. 11/693,685, dated Dec. 8, 2011, John Lattyak et al., "Relative Progress and Event Indicators", 23 pages.

Final Office Action for U.S. Appl. No. 11/763,374, mailed on Feb. 13, 2012, Thomas Ryan et al., "Consumption of Items via a User Device", 14 pages.

Non-Final Office Action for U.S. Appl. No. 11/763,393, mailed on Feb. 16, 2012, John Lattyak et al., "Incremental Updates of Items", 24 pages.

Final; Office Action for U.S. Appl. No. 12/360,089, mailed on Mar. 28, 2012, Tom Killalea et al., "Aggregation of Highlights", 17 pages.

Non-Final Office Action for U.S. Appl. No. 12/366,941, mailed on Mar. 30, 2012, Scott Dixon et al., "Bundled Digital Content", 12 pages.

Office action for U.S. Appl. No. 11/693,682, mailed on Apr. 23, 2012, Siegel et al., "Providing Annotations of a Digital Work", 12 pages.

Final Office Action for U.S. Appl. No. 11/763,386, mailed on Apr. 26, 2012, Thomas Ryan et al., "Handling of Subscription-Related Issues in a Media Consumption System", 14 pages.

The European Office Action mailed Mar. 26, 20010 for European Patent Application No. 06718773.2, a counterpart foreign application of U.S. Appl. No. 11/039,645.

Non-Final Office Action for U.S. Appl. No. 11/537,518, mailed on Apr. 28, 2011, John Lattyak, "Acquisition of an Item Based on a Catalog Presentation of Items".

Office action for U.S. Appl. No. 11/763,357, mailed on May 26, 2011, Reztlaff, "Obtaining and Verifying Search Indices".

Final Office Action for U.S. Appl. No. 11/763,314, mailed on Jun. 13, 2011, Craig S. Griffin, "Display Dependent Markup Language".

Non-Final Office Action for U.S. Appl. No. 11/693,682, mailed on Jun. 9, 2011, Hilliard B. Siegel, "Providing Annotations of a Digital Work".

PCT International Search Report and the Written Opinion for Application No. PCT/US 08/64389, mailed on Jan. 28, 2009, 7 pgs.

Office action for U.S. Appl. No. 11/763,390, mailed on Jun. 27, 2012, Bajaj et al., "Providing User-Supplied Items to a User Device", 7 pages.

Office action for U.S. Appl. No. 11/763,392, mailed on Jun. 27, 2012, Ryan et al., "Administrative Tasks in a Media Consumption System", 47 pages.

Non-Final Office Action for U.S. Appl. No. 11/763,369 mailed on Jun. 7, 2012, James R. Reztlaff II et al., "Search of Multiple Content Sources on a User Device", 20 pages.

Chinese Office Action mailed May 21, 2012 for Chinese patent application No. 200880017589.9, a counterpart foreign application of U.S. Appl. No. 11/763,369, 9 pages.

Non-Final Office Action for U.S. Appl. No. 13/083,445, mailed on May 4, 2012, Hilliard B. Siegel et al., "Method and System for Providing Annotations of a Digital Work", 20 pages.

Final Office Action for U.S. Appl. No. 11/763,395, mailed May 9, 2012, Thomas Ryan et al., "Providing Supplemental Information Based on Hints in a Media Consumption System", 12 pages.

Chinese Office Action mailed May 17, 2012 for Chinese patent application No. 20078004873.9, a counterpart foreign application of US patent No. 7,865,817, 5 pages.

Non-Final Office Action for U.S. Appl. No. 12/943,211, mailed on Jun. 6, 2012, James. R. Retzlaff II et al., "Obtaining and Verifying Search Indices", 10 pages.

BarnesandNoble.com, "Barnes and Noble Homepage", retrieved on Aug. 2, 2011 http://web.archive.org/web/19981202183957/http://www.barnesandnoble.com/, Dec. 2, 1998.

Cavanaugh, "EBooks and Accommodations", Teaching Exceptional Children, vol. 35, No. 2, Copyright 2002 CEC, 6 pages.

Chinese Office Action mailed Jul. 14, 2011 for Japanese patent application No. 20078004873.9, a counterpart foreign application of US patent No. 7,865,817, 6 pages.

Office action for U.S. Appl. No. 12/333,215, mailed on Jul. 18, 2011, Zagorie et al., "Device-Specific Presentation Control for Electronic Book Reader Devices", 22 pages.

Non-Final Office Action for U.S. Appl. No. 11/693,685, John Lattyak, "Relative Progress and Event Indicators".

Office action for U.S. Appl. No. 12/414,914, mailed on Aug. 4, 2011, Agarwal et al., "Questions on Highlighted Passages", 39 pages.

Non-final Office Action for U.S. Appl. No. 11/537,484, mailed on Aug. 19, 2011, Thomas A. Ryan, "Expedited Acquisition of a Digital Item Following a Sample Presentation of the Item", 13 pages.

Chinese Office Action mailed Aug. 25, 2011 for Chinese patent application No. 200880024964.2, a counterpart foreign application of U.S. Appl. No. 11/763,358, 6 pages.

Chinese Office Action mailed Sep. 26, 2011 for Chinese patent application No. 200880017589.9, a counterpart foreign application of U.S. Appl. No. 11/763,369, 9 pages.

Office action for U.S. Appl. No. 12/360,089, mailed on Oct. 5, 2011, Killalea et al., "Aggregation of Highlights", 75 pages.

Final Office Action for U.S. Appl. No. 11/763,392, mailed on Oct. 14, 2011, Thomas Ryan, "Administrative Tasks in a Media Consumption System", 38 pages.

Office action for U.S. Appl. No. 11/763,390, mailed on Oct. 24, 2011, Bajaj et al., "Providing User-Supplied Items to a User Device", 11 pages.

Non-final Office Action for U.S. Appl. No. 11/763,363, mailed on Aug. 26, 2011, James R. Rezlaff II, "Search Results Generation and Sorting", 10 pages.

Non-Final Office Action for U.S. Appl. No. 11/763,358, mailed on Sep. 12, 2011, James R. Retzlaff II, "Managing Status of Search Index Generation", 11 pages.

Final Office Action for U.S. Appl. No. 11/963,618, mailed on Sep. 26, 2011, Michael Rykov, "Dissemination of Periodical Samples", 15 pages.

Non-Final Office Action for U.S. Appl. No. 11/763,374, mailed on Sep. 27, 2011, Thomas Ryan, "Consumption of Items via a User Device", 17 pages.

Beigbeder et al., "An Information Retrieval Model Using the Fuzzy Proximity Degree of Term Occurences", 2005 ACM Symposium on Applied Computing, pp. 1018-pp. 1022.

Biskup, J., et al, "Towards a Credential-Based Implementation of Compound Access Control Policies" SACMAT '04, Proceedings of the ninth ACM symposium on Access control models and technologies, Jun. 4, 2004, NY, retrieved from the internet: http://portal.acm.org/citation.cfm?id=990036.990042 (retrieved Nov. 9, 2010.

Breu, M. et al., "The Medoc Distrubuted Electronic Library: Accounting and Security Aspects", Electronic Publishing, New Models and Opportunities, Proceedings of an ICCC/IFIP Conference, Apr. 14, 1997, pp. 237-249.

Gladney, H. M.: "Access Control for Large Collections", NY, vol. 15, No. 2, Apr. 1, 1997, pp. 154-194.

Navarro, et al., "Modern Information Retrieval, Chapter 8: Indexing and Searching", Jan. 1, 1999, Modern Information Retrieval, ACM Press, New York, pp. 191-228.

Ziviani, N ED, Baeza-Yates R. et at: "Modern Information Retrieval, Text Operations", Jan. 1, 1999, Modern Information Retrieval, ACM Press, NY, pp. 163-190.

"Annotation Engine," Berkman Center for Internet & Society at Harvard Law School <http://cyber.law .harvard. edulproj ectsl annotate.html> [Retrieved Jan. 30, 2004].

"Annotator Instructions," Berkman Center for Internet & Society at Harvard Law School <<http://cyber.law.harvard.edu/annotate/instructions.html>>, also found at <<http://cyber.law.harvard.edu/cite/instructions.html>>, [Retrieved Jan. 30, 2004].

"Annotator Wishlist," Berkman Center for Internet & Society at Harvard Law School r <http://cyber.law.harvard.edulcite/annotate.cgi ?action=print&markup ;center=; view=http%3A%2F%2Fcy . . . > [Retrieved Jan. 30, 2004].

Roscheisen, M., et al., "Beyond Browsing: Shared Comments, SOAPs, Trails, and On-Line Communities," Computer Networks and ISDN Systems 27:739-749, 1995.

Canadian Office Action mailed Apr. 14, 2009 for Canadian Patent Application No. 2594573, a counterpart foreign application of U.S. Appl. No. 11/039,645.

Chinese Office Action mailed May 9, 2008 for Chinese Patent Application No. 200680002606.2, a counterpart foreign application of U.S. Appl. No. 11/039,645.

Chinese Second Office Action mailed Jun. 5, 2009 for Chinese Patent Application No. 200680002606.2, a counterpart foreign application of U.S. Appl. No. 11/039,645.

Chinese Third Office Action mailed Nov. 27, 2009 for Chinese Patent Application No. 200680002606.2, a counterpart foreign application of U.S. Appl. No. 11/039,645.

Carter, S., et al., "Digital Graffiti: Public Annotation of Multimedia Content," Proceedings o/the CHI2004, Vienna, Austria, Apr. 24-29, 2004, pp. 1207-1210.

Extended European Search Report mailed Dec. 22, 2009, issued in corresponding European Patent Application No. EP 06 71 8773.2, filed Jan. 18, 2006.

The European Office Action mailed Dec. 12, 2009 for European Patent Application No. 06718773.2, a counterpart foreign application of U.S. Appl. No. 11/039,645.

The European Search report mailed Dec. 22, 2009 for European Patent Application No. 06718773.2, a counterpart foreign application of U.S. Appl. No. 11/039,645.

Office Action from the U.S. Patent and Trademark Office for U.S. Appl. No. 11/763,375, mailed Feb. 23, 2010, 15 pages.

Final Office Action for U.S. Appl. No. 11/763,358, mailed on Apr. 5, 2011, James R. Retzlaff II, "Managing Status of Search Index Generation".

Japanese Office Action mailed Jan. 25, 2011 for Japanese Patent Application No. 2007-552235, a counterpart foreign application of U.S. Appl. No. 11/039,645.

International Search Report mailed Sep. 9, 2008, in International Application No. PCT/US/08/64387, filed May 21, 2008, 1 page.

International Search Report mailed Aug. 15, 2008, in International Application No. PCT/US07/89105, filed Dec. 28, 2007, 2 pages.

International Search Report mailed Aug. 15, 2008, in corresponding International Application No. PCT/US08/57829, filed Mar. 21, 2008, 1 page.

International Search Report mailed Jul. 7, 2008, in International Application No. PCT/US08/57848, filed Mar. 31, 2008, 2 pages.

PCT International Search Report and the Written Opinion for Application No. PCT/US2006/001752, mailed on Jul. 27, 2006, 8 pgs.

"Say No to Third Voice," Worldzone.net, 1999-2004, <http://worldzone.netiinternetipixelsnttv/index.html> [retrieved Jan. 30, 2004].

"The Berkman Center for Internet & Society at Harvard Law School: Annotation Engine," Harvard.Edu, 1999-2004, <http://cyber.iaw.harvard.eduJprojects/annotate.html> [Retrieved Jan. 30, 2004].

Marshall, C.C., "The Future of Annotation in a Digital (Paper) World," Proceedings o/the 35th Annual GSLIS Clinic, University of Illinois at UrbanaChampaign, Urbana, 11, Mar. 22-24, 1998, pp. 1-19.

Kumar, A., "Third Voice Trails off . . . ," Wired News, 2004, <http://www.wired.comlnews/printIO. 1294,42803 ,00.html> [retrieved Jan. 30, 2004].

Desmoulins et al., "Pattern-Based Annotations on E-books: From Personal to Shared Didactic Content", Proceedings of the IEEE International Workshop on Wireless adn Mobile Techniques in Education, 2002, 4 pages.

Leach et al, "A Universally Unique IDentifier (UUID) URN Namespace", Jul. 2005, IETF, retrieved on Apr. 21, 2010 at http://tools.ietf.org/pdf/rfc4122.pdf, 32 pgs.

Chinese Office Action mailed Oct. 10, 2011 for Chinese patent application No. 200880017259.X, a counterpart foreign application of U.S. Appl. No. 11/693,682, 7 pages.

Chinese Office Action mailed Sep. 30, 2011 for Chinese patent application No. 200880025056.5, a counterpart foreign application of U.S. Appl. No. 11/763,374, 9 pages.

Final Office Action for U.S. Appl. No. 12/759,828, mailed on Nov. 10, 2011, James R. Retzlaff II, "Search and Indexing on a User Device", 16 pages.

Final Office Action for U.S. Appl. No. 11/537,518, mailed on Nov. 25, 2011, John Lattyak, "Acquisition of an Item Based on a Catalog Presentation of Items," 8 pages.

Non-Final Office Action for U.S. Appl. No. 11/763,386, mailed on Nov. 8, 2011, Thomas Ryan, "Handling of Subscription-Related Issues in a Media Consumption System", 10 pages.

Non-Final Office Action for U.S. Appl. No. 11/763,395, Thomas Ryan, "Providing Supplemental Information Based on Hints in a Media Consumption System ", 10 pages.

* cited by examiner

READER DEVICE CONTENT INDEXING

BACKGROUND

Electronic distribution of information has gained in importance with the proliferation of personal computers, and has undergone a tremendous upsurge in popularity as the Internet has become widely available. With the widespread use of the Internet, it has become possible to distribute large, coherent units of information, such as books, using electronic technologies. Books and other printed works available through electronic technologies are commonly referred to as electronic books ("eBooks"). Typical eBook reader devices attempt to mimic the experience of reading a conventional paper book or other printed works through display of electronic information on one or more electronic displays. A typical eBook reader device is a handheld digital device having a liquid crystal display panel and enough memory and processing capability to store several eBooks. Such a device is capable of retrieving and displaying an eBook, in whole or in part, for reading.

There are some advantages to using an eBook reader device over conventional paper books or other printed works. An eBook reader device is often capable of storing a number of complete works. Therefore, an eBook reader device containing a number of stored works weighs significantly less than the same number of printed works. This makes an eBook reader a particularly attractive alternative to paper books for travel, educational purposes, and professional business use. Also, because eBooks do not require the use of paper products, they are generally offered at a lower price than their printed counterparts. Furthermore, the use of eBook reader devices in conjunction with eBooks may be beneficial to the ecosystem, by reducing a number of printed works produced using paper products.

To date, however, eBook readers and the use of eBooks in general have not achieved widespread consumer acceptance. This is mainly attributable to the design and implementation particulars of conventional eBook reader devices and the manner in which content usable with such devices is attainable.

The preceding description of conventional eBook reader devices was provided herein for contextual reasons only.

SUMMARY

An electronic book ("eBook") reader device and a method for operating a reader device are provided that include content indexing features designed to improve a reading experience. A plurality of electronic publication indexes is stored on the eBook reader device. At least one of the indexes stored in the reader device is also stored at a remote site. Several indexes stored at the remote site may be substantially similar to one or more of the indexes stored on the reader device. The indexes stored at the remote site may be used to update one or more indexes stored on the reader device. In one implementation, the remote site is a content repository that includes content available for purchase and download.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
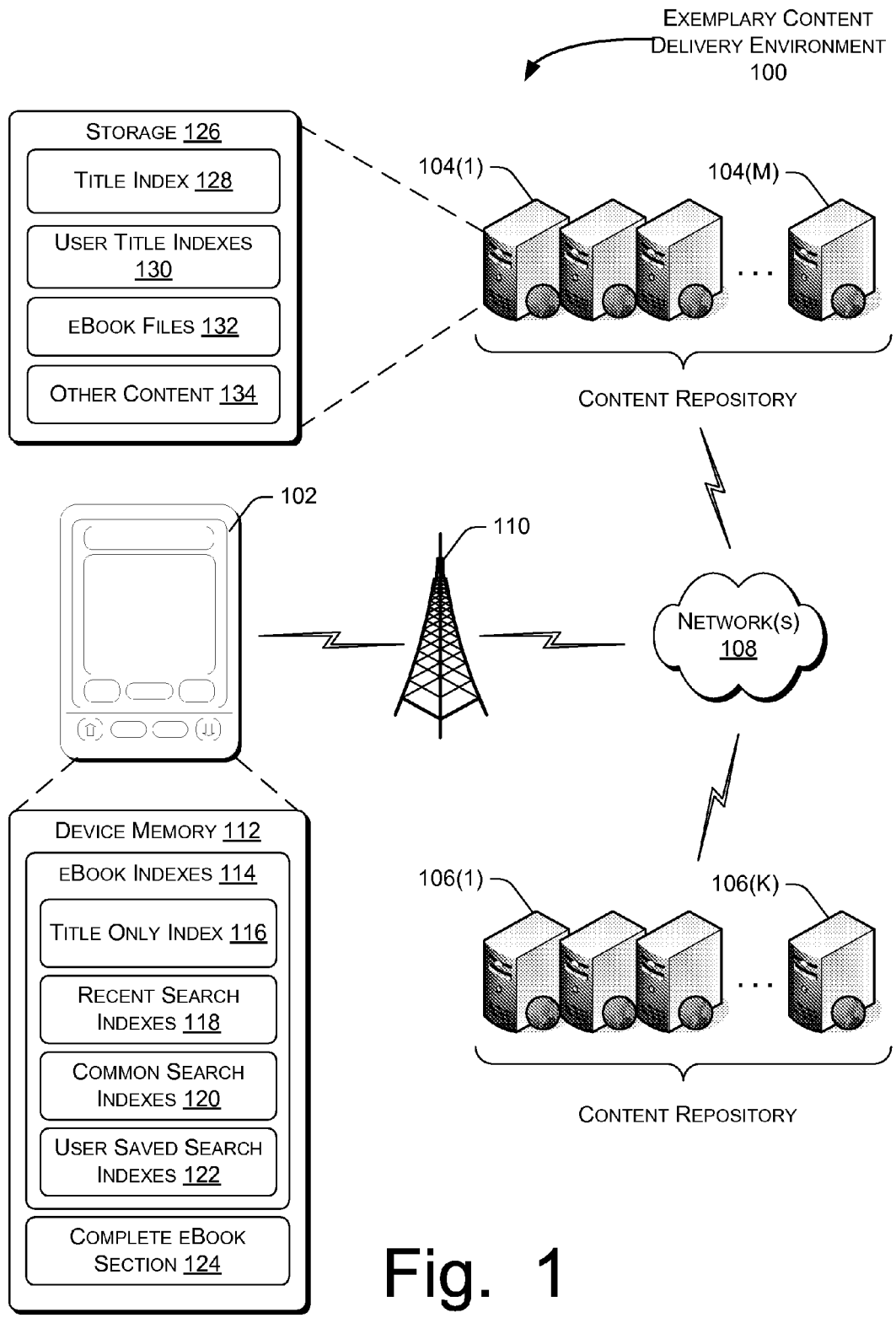
FIG. 1 illustrates an exemplary electronic content delivery environment. The environment includes an electronic book ("eBook") reader device in communication with at least one content repository.

As will be appreciated from the following disclosure, linking a reader device with a content repository creates an arrangement that will generally make the use of reader devices more attractive. The implementations described herein provide an environment in which content is simple to locate, retrieve and consume using a reader device that includes systems and methods that provide several indexes related to content.

The terms "book" and/or electronic book ("eBook") as used herein include electronic or digital representations of printed works, as well as digital content that may include text, multimedia, hypertext and/or hypermedia. Examples of printed and/or digital works include, but are not limited to, books, magazines, newspapers, periodicals, journals, reference materials, telephone books, textbooks, anthologies, instruction manuals, proceedings of meetings, forms, directories, maps, etc. Accordingly, the terms book and/or eBook may include any content that is in electronic or digital format.

The description herein provides a non-limiting implementation of an electronic device in the form of an eBook reader device. It is noted, however, that various aspects and features described herein may be implemented in other electronic devices or electronic readers besides eBook reader devices including, for example, portable computers, personal digital assistants (PDAs), portable gaming devices, wireless phones, and the like.

Users of readers implemented as described herein will have a virtual bookstore literally at their finger tips. More specifically, a reader device according to an exemplary implementation described herein makes it possible to search for books, view book summaries, and retrieve books and read retrieved books. All of this is possible from the comfort of one's home, or virtually any other location for that matter.

As noted above, several indexes may allow an eBook reader device to access and use electronic content that may be displayed and/or stored in the device. At least one of the several indexes corresponds to an index stored at a content repository. The indexes stored on an eBook reader device may include a title only index, compiled indexes associated with recent index searches performed on an eBook reader device, and indexes that are associated with unique users of a reader device. In addition, several of the indexes stored in an eBook reader device may be compiled from metadata related to eBooks. The metadata may be used to locate eBooks or other content of interest stored in the eBook reader device and/or a content repository.

In on implementation, an eBook reader device includes wireless communications capabilities. These capabilities allow the eBook reader device to receive index updates and content from a content repository. The index updates may be solicited or unsolicited deliveries from a content repository. The index updates may also be delivered from other sources that store electronic content that may be used on an eBook reader device.

Various examples of indexing features applied to an eBook reader are described below with reference to FIGS. 1-13.

Exemplary Environment

FIG. 1 illustrates an exemplary eBook content delivery environment 100 in which an eBook reader device 102 communicates with one or more content repositories 104(1)-104(M) and/or 106(1)-106(K). In one implementation, the reader device 102 communicates with the content repositories 104 and 106 via a network(s) 108 and/or a wireless link 110. For example, the reader device 102 may connect to the content repositories 104 and 106 using a wired-connection interfaced with the network(s) 108 and/or using wireless communications technology employed by the device 102. The content repositories 104 and 106 may be hosted by an entity or service that offers eBook content for purchase via the Web. The network 108 is representative of many different types of networks, such as cable networks, local area networks, wide area networks, the Internet, wireless networks, and any combinations thereof. Henceforth, this disclosure describes an eBook reader device communicating with one content repository. However, an eBook reader is capable of communicating with a plurality of content repositories. Moreover, content repositories described herein are capable of handling requests from a plurality of eBook reader devices.

The content repositories 104(1)-104(M) and/or 106(1)-106(K) are employed on one or more servers, perhaps arranged as a server farm. Other server architectures may also be used to implement the content repositories 104(1)-104(M) and/or 106(1)-106(K). The content repositories 104(1)-104(M) and/or 106(1)-106(K) are capable of handling requests from many entities and providing, in response, eBook related content that may be received by one or more eBook reader devices 102.

The wireless link 110 that is used by the eBook reader device 102 to communicate with the content repository 104 may be implemented using any applicable wireless technology. The wireless link 110 may also be used by the content repository 104 to communicate with the reader device 102. Ordinarily, the wireless link 110 includes cell sites, base stations and Mobile Telephone Switching Offices (MTSO). Each base station contains a radio transceiver and controller, and provides radio communications to wireless devices operating in its cell. The cells are typically engineered into a network that is deployed in a hexagonal cell pattern, in order to provide local, regional, or national wireless coverage. The MTSO links cells together using traditional copper, fiber optic, and/or microwave technology and acts as a central office exchange, allowing wireless devices to connect to various other communication mediums. One such communication medium is the network 108.

The content repositories 104 and 106 are configured to support providing content to one or more eBook reader devices 102. As will be described in greater detail later, the content may be works that are readable using the eBook reader device 102. Other content for use with the reader device 102 may be stored in the content repositories 104 and 106 as well, such as magazines and newspapers in electronic format. The content repositories 104 and 106 may also provide information related to conventional printed works. This information may include downloadable electronic summaries of the conventional printed works. Other non-limiting examples of information that may be stored in the content repositories 104 and 106 include periodicals and newspapers in electronic format, and Really Simple Syndication (RSS) feeds. Therefore, as noted above, the eBook reader device 102 may be considered as a general reader device that is capable of displaying any content that is stored in electronic format.

The content repository 104 includes a storage medium 126. The content repository 106 may include a similar storage medium as well. The storage 126 includes a title index 128, a plurality of user title indexes 130, various eBook files 132 and other content 134. Although the indexes 128 and 130 are shown as separate, they may be merged into one index as well. This is also true of the other indexes described in the following description. The storage 126 may be implemented using, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by the content repository 104.

The eBook reader device 102 includes a device memory 112. The device memory 112 contains at least eBook indexes 114. These eBook indexes 114 include a title only index 116, recent search indexes 118, common search indexes 120, and user saved indexes 122. The device memory 112 also contains a complete eBook section 124 that is used to store one or more eBooks for use with the reader device 102.

Additional details related to the storage 126 and the device memory 112 are provided below.

Exemplary Repository Content

Content of the storage 126 employed in the content repository 104 is described in detail with reference to FIG. 2. The content described in the following is exemplary only. An entity managing the eBook reader repository 104 may update the content of the storage 126 from time-to-time and as required as new and/or additional content is added to the repository 104. The content update process may be similar to a synchronization process that may be triggered by a request for data, an expiration of a time period, a notification that an update is available, after a certain volume of new data is available, and so forth.

The title index 128 housed in the storage 126 includes a title only index 202 and a title metadata index 204. The title only index 202 has index entries that include titles of eBooks offered for download by the content repository 104. The title only index 202 is shown as including Titles 1-N (e.g., To Kill a Mocking Bird, etc.). The title metadata index 204 includes metadata entries related to eBooks offered for download by the content repository 104. The metadata entries are shown in FIG. 1 as including Title 1 Metadata-Title L Metadata. Particulars related to the metadata entries stored in the content repository 104 and the eBook reader device 102 are discussed in detail in connection with FIG. 4. EBook reader devices that connect to the content repository 104 may use the title index 128 to search for eBooks offered for purchase and download.

The user title indexes 130 of the storage 126 include several user indexes captured from eBook reader devices (e.g., reader device 102) that have connected with the content repository 104. The content repository 104 may track keyword searches performed by the eBook reader device 102. Generally, such keyword searches relate to eBook content stored in the content repository 104. The eBook titles/metadata relevant to those searches may be stored in the user title indexes 130 as user specific indexes directed to particular eBook topics/titles. The content repository 104 may use the user specific indexes to tailor the content of various updates sent to the eBook reader device 102.

Figure 2:
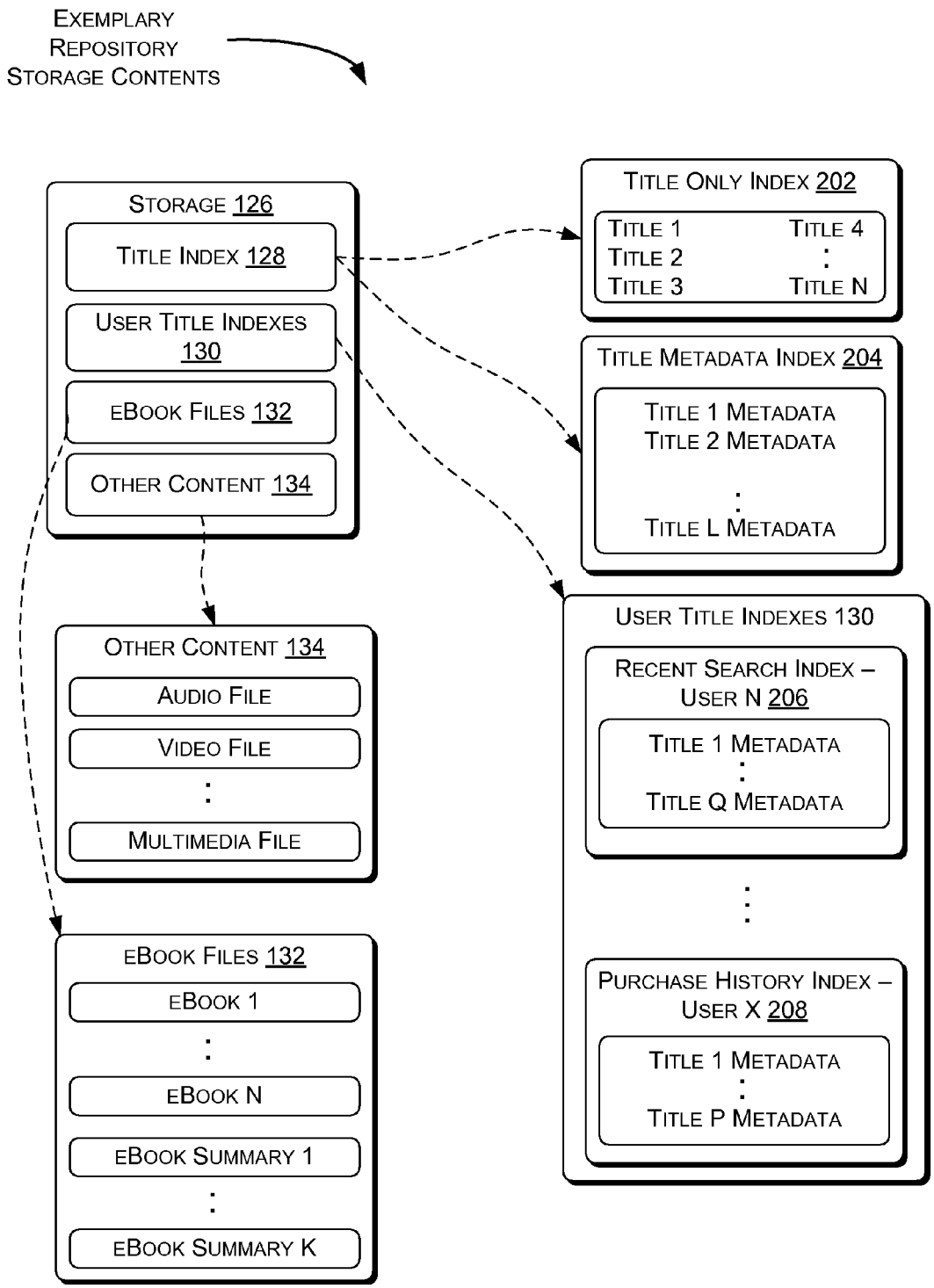
FIG. 2 illustrates content of storage contained within a content repository. The content includes eBooks for use with reader devices.

In the exemplary implementation illustrated in FIG. 2, the user title indexes 130 include a recent search index 206 associated with a User N. The recent search index 206 includes Title 1 Metadata-Title Q Metadata. The recent search index 206 was captured by the content repository 104 during a searching process. The recent search index 206 includes content references (e.g., eBook metadata) that relate to a general keyword search performed by the eBook reader device 102.

The user title indexes 130 also include a purchase history index 208 associated with a User X. The purchase history index 208 includes Title 1 Metadata-Title 2 Metadata. In one implementation, the metadata listed in the index 208 relates to eBooks purchased by the User X. Those purchases were made possible through the use of the eBook reader device 102. Entries in the purchase history index 208 may be used to tailor future eBook related information and other information transmitted to the eBook reader device 102. For example, entries in the index 208 may serve as a basis for transmitting advertisements related to the purchase history, recommendations, promotional coupons or other forms of advertisements, and so forth.

The eBook files 132 of the storage 126 include numerous eBooks 1-N, or other electronic content that may be used by the eBook reader device 102. The eBooks are preferably stored in an electronic format that is displayable on a display of the eBook reader device 102. Depending on the storage capability of the content repository 104, the number of eBooks included in the eBook files 132 may be in the thousands and even the millions. Some or all of the eBooks included in the eBook files 132 are referenced in the title only index 202 and/or the title metadata index 204. In addition to the eBooks 1-N, the eBook files 132 may also include separate eBook Summary 1-K files related to eBooks offered for purchase and download.

These eBook summaries may be sent to the eBook reader device 102 upon request. Alternatively, the eBook summaries may be sent to the reader device 102 automatically during an update procedure implemented by the content repository 104. Such an update procedure may be triggered by the content repository 104 on a periodic basis, by an update schedule in the reader device 102, or some other update activation process. In addition, summaries related to conventional paper books may also be stored in the storage 126 and made available for download or delivery to the reader device 102. Summaries sent to the reader device 102 may be for the purpose of promoting a book recently offered for sale or about to be offered for sale, at the request of an author that desires increased sales, or any other applicable reason.

The other content 134 of the storage 126 include content that is not generally considered as being related to a printed work, but are otherwise useable on the eBook reader device 102. For example, the other content 134 is shown in FIG. 2 as including audio files (e.g., audio books), video files and multimedia files. The other content of the storage 126 may also include the mentioned downloadable electronic summaries of the conventional paper books, the periodicals and newspapers in electronic format, and the RSS feeds, to name a few.

Exemplary eBook Reader Device Memory

Content of the device memory 112 employed in the eBook reader device 102 is described in detail with reference to FIG. 3. The content described in the following is exemplary only.

The title only index 116 contains index entries related to eBook titles that are offered on the content repository 104. Generally, the title only index 116 includes the same index entries included in the title index 128 found in the storage 126. However, the total number of index entries included in the title only index 116 may be limited if the memory capacity of the eBook reader device 102 is approaching full capacity.

Figure 3:
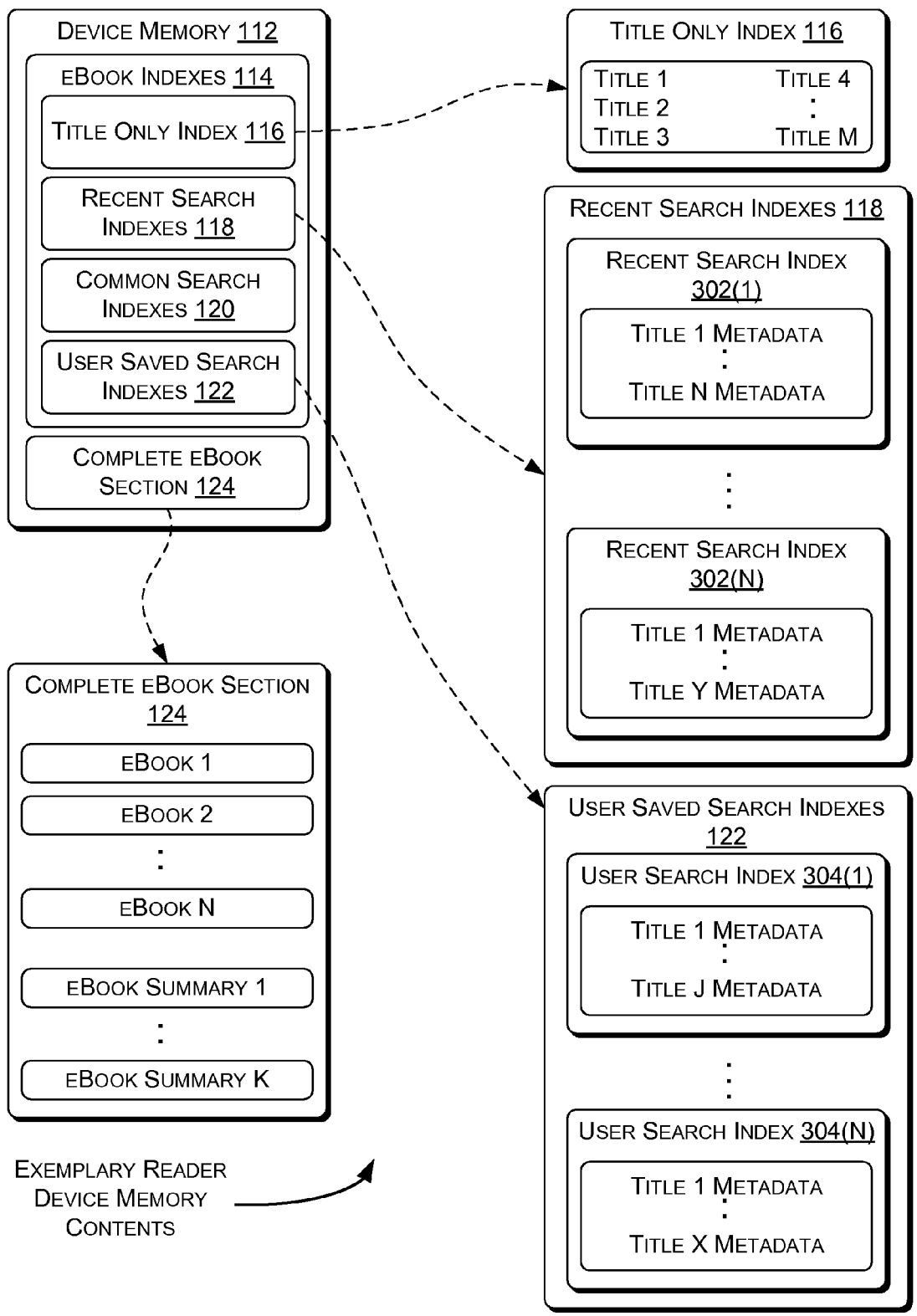
FIG. 3 illustrates content of memory contained within an eBook reader device. The content includes a plurality of indexes related to content useable with an eBook reader device.

FIG. 3 shows that the title only index 116 includes eBook Titles 1-M (e.g., To Kill a Mocking Bird, etc.). Depending on the capacity of the device memory 112, the eBook Titles 1-M may number in the thousands and even in the millions. The title only index 116 is maintained in a current state through periodic updates received from the content repository 104. More particularly, eBook titles added to the title only index 202 may be wirelessly sent to the eBook reader device 102 for inclusion in the title only index 116. This type of update process may be solicited or unsolicited. The title only index 116 may also be replaced entirely by the title only index 202 located in the storage 126 of the content repository 104. Once again, this may occur during an update process performed by the repository 104, over a wireless or wired connection.

The recent search indexes 118 of the device memory 112 include indexes captured by the eBook reader device 102 during a searching process conducted therewith. For example, a recent search index 302(1) may include various eBook references that relate to a general keyword search performed by the reader device 102. In the FIG. 3, these references are shown as Title 1 Metadata-Title N Metadata. The metadata referenced in the recent search index 302(1) was received from the content repository 104 after a preliminary search of the title only index 116. After eBook titles are identified from the preliminary search, the reader device 102 wirelessly communicates with the content repository 104 to retrieve metadata related to the identified eBook titles. The reader device 102 may also communicate with the repository using a wired connection. The content repository 104 stores such metadata in the storage 126. The recent search indexes 302(1)-302(N) may be linked to unique user logon credentials held by the reader device 102.

The common search indexes 120 of the device memory 112 include indexes generated by the eBook reader device 102 during a searching process conducted therewith. More particularly, the indexes included in the common search indexes 120 may include various eBook references that relate to commonly used keyword searches performed by the reader device 102. For example, a user of the eBook reader device 102 may commonly search for eBooks that relate to computer architecture. Maintaining several indexes related to commonly searched keywords eliminates having to perform the same search again. Furthermore, similar to the indexes contained in the recent search indexes 118, the indexes of the common search indexes 120 are augmented with metadata after a preliminary search of the title only index 116. The metadata is retrieved from the content repository 104. The common search indexes 120 may be linked to unique user logon credentials held by the reader device 102. The common search indexes 120 are substantially similar to the recent search indexes 118. Therefore, a detailed illustration of the common search indexes 120 is not provided in FIG. 3.

The user saved search indexes 122 of the device memory 112 include indexes generated by the eBook reader device 102 during a searching process conducted therewith. The indexes included in the user saved search indexes 118 were retained in the eBook reader device 102 by user request. In one implementation, the user indexes are linked with unique user logon credentials held by the reader device 102.

FIG. 3 shows that the user saved search indexes 122 include user search indexes 304(1)-304(N). Similar to the indexes included in the recent search indexes 118, the user search index 304(1) may include various eBook references that relate to a general keyword search performed by the reader device 102. These references are shown as Title 1 Metadata-Title J Metadata. The metadata referenced in the recent search index 302(1) was received from the content repository 104 after a preliminary search of the title only index 116. After eBook titles are identified from the preliminary search, the reader device 102 wirelessly communicates with the content repository 104 to retrieve metadata related to the identified eBook titles. The reader device 102 may also communicate with the repository using a wired connection. As previously indicated, the content repository 104 stores such metadata in the storage 126.

The complete eBook section 124 of the device memory 112 holds eBooks 1-N that are stored locally on the eBook reader device 102. The eBook section 124 may also hold eBook summaries 1-K. The amount of content stored in the section 124 is a function of the storage capability of the device memory 112, the design particulars of the reader device 102, and/or user specified parameters. In one implementation, some or all of the content stored in eBook section 124 was obtained from the content repository 104. The eBook section 124 may also hold summaries related to conventional paper books. The complete eBook section 124, or some other portion of the device memory 112, may also store other content that may be utilized with the eBook reader device 102. Such content may include periodicals and newspapers in electronic format, RSS feeds, audio books, music, and video media.

Exemplary Metadata

Figure 4:
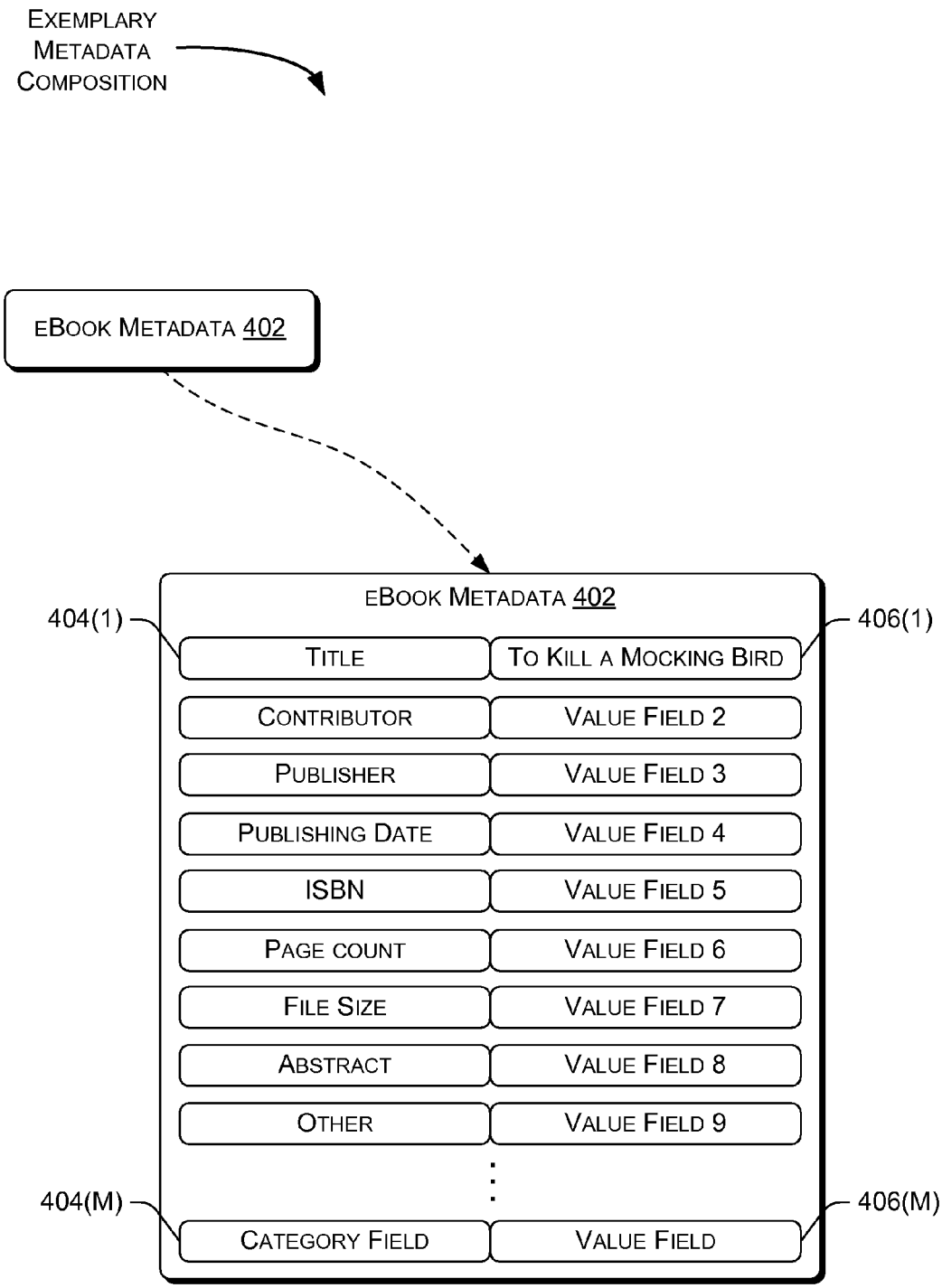
FIG. 4 illustrates an exemplary metadata composition that may be associated with one or more indexes stored in an eBook reader device.

FIG. 4 illustrates an exemplary implementation of metadata that may be stored in an eBook reader device and a content repository. For example, the eBook metadata 402 illustrated in FIG. 4 is indicative of the type of metadata stored in the device memory 112 and the storage 126. Information included as part of the eBook metadata 402 is fully searchable using a keyword search, or the like.

In the figure, an eBook metadata 402 includes category fields 404 and value fields 406. In this example, the metadata includes M pairs of fields, including eight particular categories: Title; Contributor (e.g., Author); Publisher; Publishing Data; International Standard Book Number (ISBN); Page Count; eBook File Size; eBook Abstract; and Other. If an eBook reader device has limited storage capability, the eBook metadata 402 may include a subset of these categories, such as the Title, Contributor and eBook Abstract categories.

In one exemplary implementation of the eBook metadata 402 the Other category includes information related to other available formats for a given eBook. Such formats may include one or more audio-book versions of the given eBook, and different language versions of the eBook. The Other category may include rating information that is compiled from reviews of the given eBook and/or a related conventional printed work. For example, an entity may employ a four or five star rating system that is used to convey users' opinions given after reading the eBook. Therefore, the information associated with the Other category may be periodically updated to reflect current reviews provided by others. Certainly, other categories of the metadata 402 may be changed/updated from time-to-time as well.

Additional category and value field combinations may be included in metadata as well. Accordingly, although eight different categories are shown in the eBook metadata 402, this is entirely exemplary and more or less categories may be used in various implementations. Associated with each category is a value field. The value field is shown as being one contiguous data field, but may be a plurality of data fields as well. On example of a value field associated with the title field is "To Kill a Mocking Bird".

Exemplary eBook Reader Device

Figure 5:
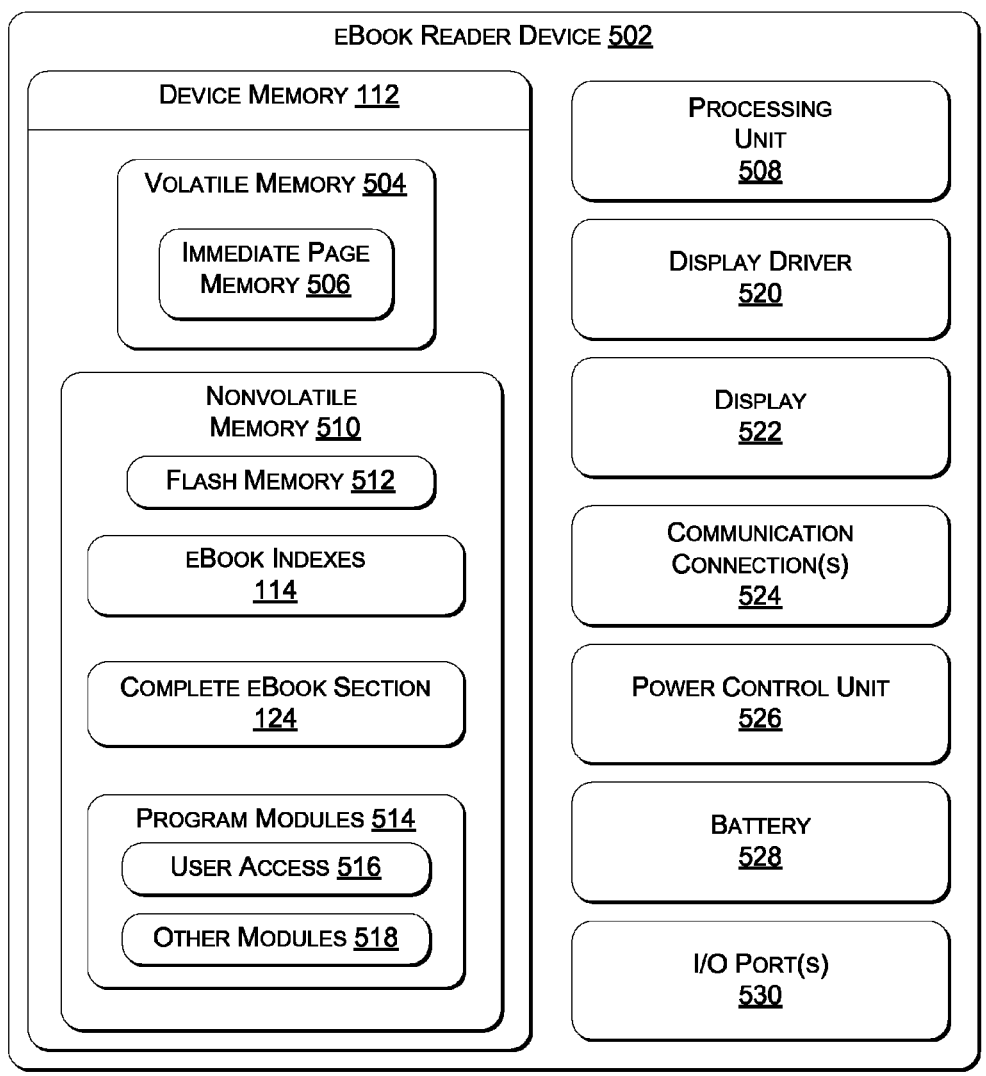
FIG. 5 illustrates exemplary components that may be used to implement an eBook reader device.

Exemplary eBook reader device components 500 are described in detail with reference to FIG. 5. The eBook reader device 102 may include some or all of the components described in relation to the eBook reader device 502 depicted in the figure.

In a very basic configuration, the eBook reader device 502 includes a processing unit 508, the device memory 112 and a display driver 520 that controls eBook content output to a display 522 of the reader device 502. Depending on the exact configuration of an eBook reader device 502, the device memory 112 includes a volatile memory 504 (such as RAM) and a nonvolatile memory 510. The volatile memory 504 includes a memory portion designated as an immediate page memory 506. The immediate page memory 506 may include one or more pages of an eBook. The pages held by the immediate page memory 506 are placed therein a short period before a next page request is expected. An algorithm may be used to predict the rate at which a user turns pages. Pages retrieved from the page memory 506 are displayed on the display of the reader device 502.

The term "page" as used herein refers to a collection of content that is presented at one time in the display 522. Thus, a "page" as described herein may be understood as a virtual frame of the content, or a visual display window presenting the content to the user. Thus, "pages" as described herein are not fixed permanently, in contrast to the pages of published "hard" books or other printed works. Instead, pages described herein may be redefined or repaginated when, for example, the user chooses a different font for displaying the content in the display 522.

The nonvolatile memory 510 includes a flash memory 512 that typically contains an operating system of the eBook reader device 502. The memory 510 also includes the eBook indexes 114 and the complete eBook section 124. Several program modules 514 are stored in the memory 510 and may include a user access module 516 and other modules 518. The other modules 518 may include power management instructions that may be used to control an amount of electrical energy supplied to various components of the eBook reader device 502. Copending application "Predictive Reader Power Management", application Ser. No. 11/277,880, filed Mar. 29, 2006, discloses various implementations for controlling device power consumption. The entirely of application Ser. No. 11/277,880 is hereby incorporated herein by reference. Other modules may also be included in accordance with the design particulars of the reader device 502.

The user access module 516 includes instructions associated with user logon procedures and requirements. For example, a logon procedure may be implemented to identify and obtain identification information related to users of the eBook reader device 502. This identification information may be used to establish user credentials assigned to users of the reader device 502. Verifying user credentials may include requiring users to enter assigned usernames and passwords before operation of the reader device 502 is permitted, or access to privileged information is allowed. The logon procedure may be included as part of the operating system of the eBook reader device 502. Alternatively, biometric authentication (e.g., fingerprint user identification) may be employed by the eBook reader device 502 to identify distinct users. Technologies related to logon procedures and biometrics are known and thus are not described in further detail herein.

The eBook reader device 502 also includes a communication connection(s) 524 to allow the eBook reader device 502 to communicate with other devices, such as over a network (e.g., the Internet). At the very least, the communication connection(s) 524 includes technology that enables the reader device 502 to communicate wirelessly. The communication connection(s) 524 is one example of communication media. Communication media may typically be embodied by computer readable instructions, data structures, program modules, or other data in a modulated data signal, such as a carrier wave or other transport mechanism, and includes any information delivery media. The eBook reader device 502 also includes a power control unit 526 and a battery 528. The power control unit 524 operatively controls an amount of electrical energy supplied by the battery 528. The manner in which the power control unit 524 controls an amount of electrical energy supplied by the battery 528 is dictated by the power management instructions of the other modules 518. The processing unit 508 supplies computing resources to the power control unit 526, as well as the other components of the eBook reader device 502.

The eBook reader device 502 may have additional features or functionality. For example, the eBook reader device 502 may also include additional data storage devices (removable and/or non-removable) such as, for example, magnetic disks, optical disks, or tape. The additional data storage media may include volatile and nonvolatile, removable and non-removable media implemented in any method or technology for storage of information, such as computer readable instructions, data structures, program modules, or other data.

The device memory 112 is an exemplary example of computer storage media. Thus, computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the eBook reader device 502. Any such computer storage media may be part of the eBook reader device 502. The eBook reader device 102 may also have input device(s) such as keyboard, mouse, pen, voice input device, touch input device, external electrical energy connectivity, etc. Output device(s) such as an auxiliary display, speakers, printer, etc. may also be included. Such input/output device(s) may be connected to one or more I/O ports(s) 530. Various devices described above are well know in the art and need not be discussed at length.

Various instructions, methods and techniques described herein may be considered in the general context of computer-executable instructions, such as program modules, executed by one or more computers or other devices. Generally, program modules include routines, programs, objects, components, data structures, etc. for performing particular tasks or implement particular abstract data types. These program modules and the like may be executed as native code or may be downloaded and executed, such as in a virtual machine or other just-in-time compilation execution environment. Typically, the functionality of the program modules may be combined or distributed as desired in various embodiments. An implementation of these modules and techniques may be stored on or transmitted across some form of computer readable media.

Exemplary eBook Reader Device Interface

Figure 6:
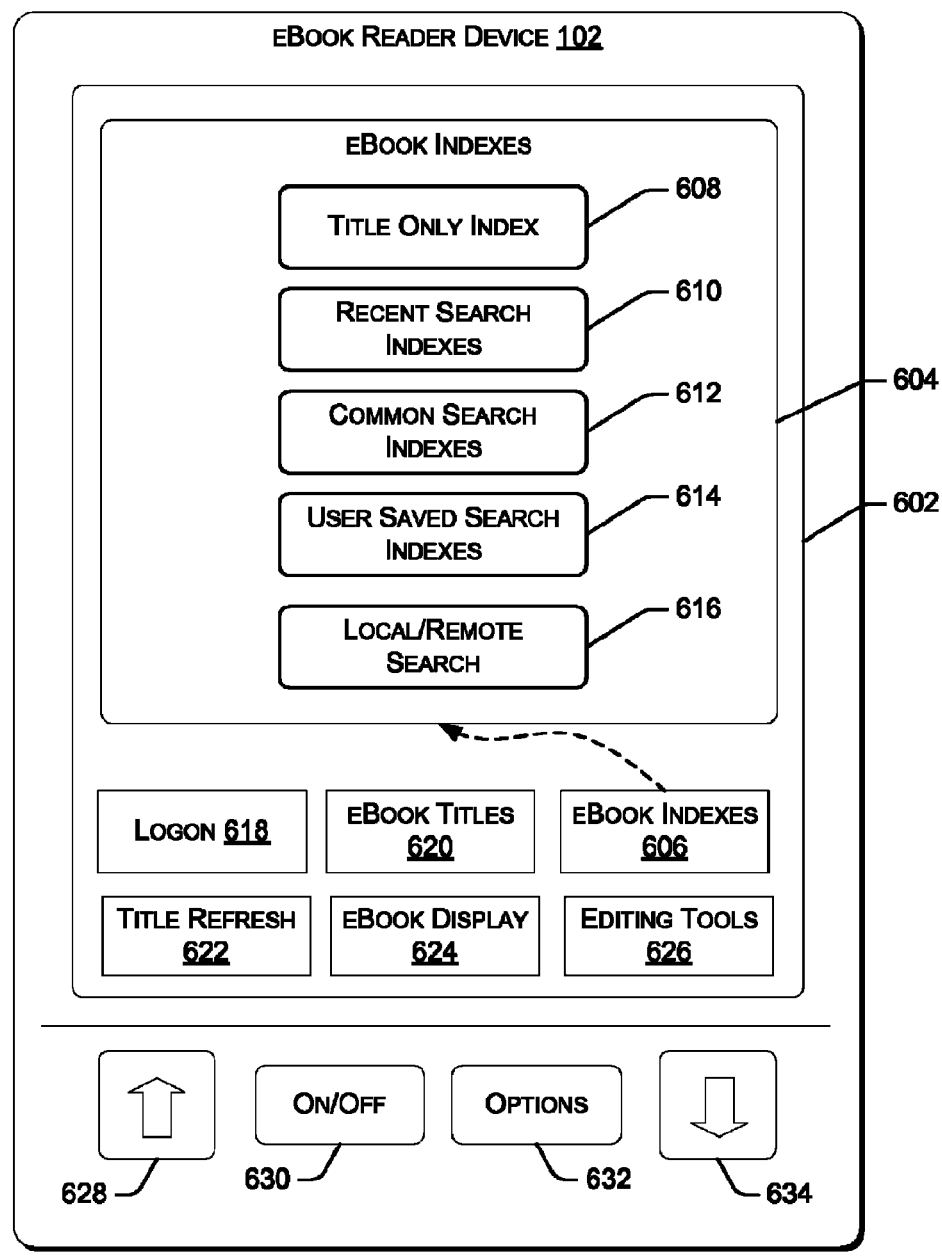
FIG. 6 illustrates an index screen rendered on an eBook reader device. In this illustration, exemplary indexes stored in an eBook reader device are shown.
Figure 7:
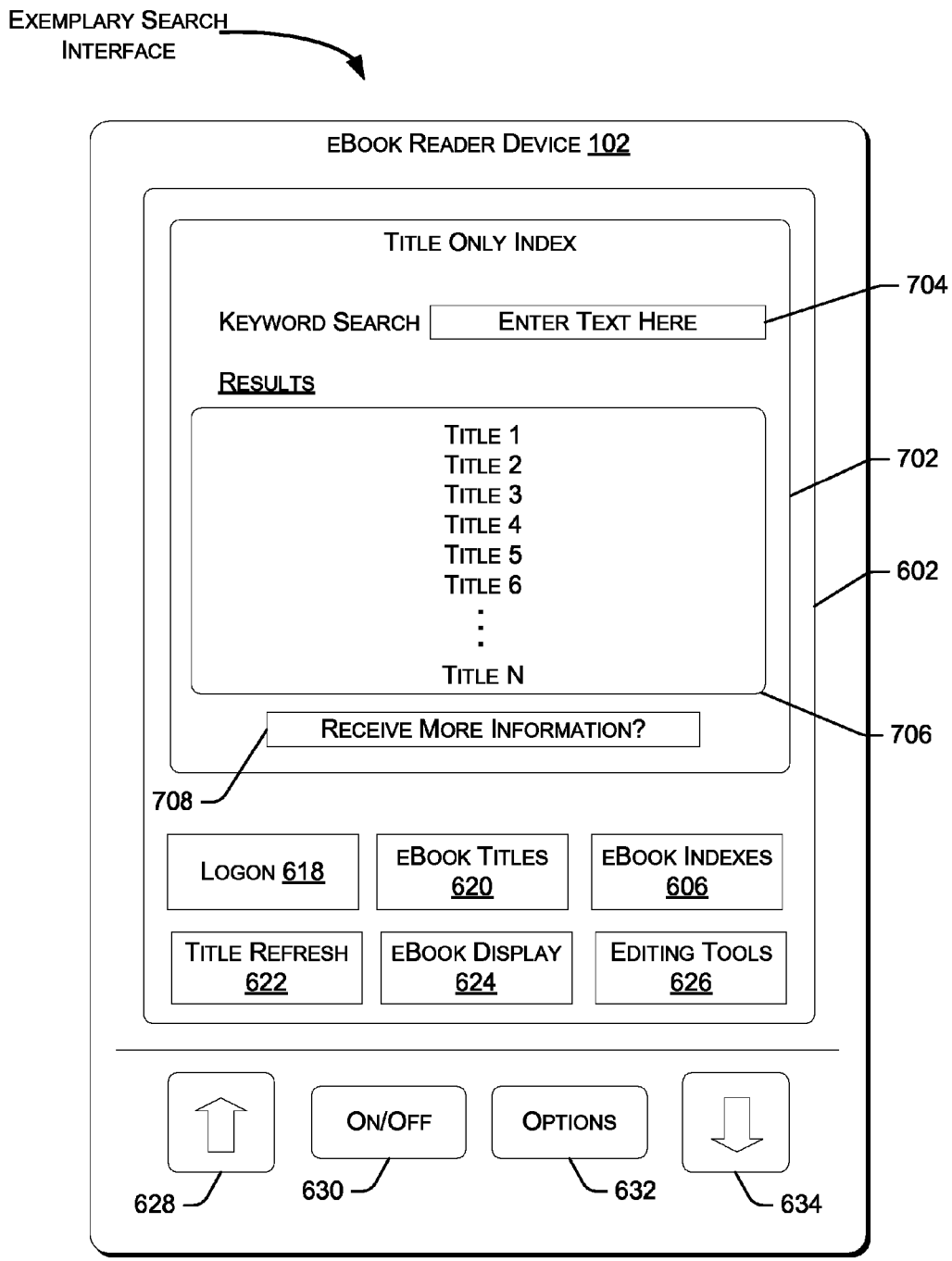
FIG. 7 illustrates an index search screen rendered on an eBook reader device. In this illustration, the index search screen is linked to an exemplary title only index stored in an eBook reader device.

FIGS. 6-9 illustrate exemplary implementations of various screens that may be displayed on a display 602 of the eBook reader device 102. The illustrated screens may be accessed using an options button 632, through the display 602 if it is touch screen enabled, or through any suitable interface technology of the eBook reader device 102. Generally, the illustrated screens offer graphical user interfaces that allow users to operate the eBook reader device 102 in a desired manner. The particular screens illustrated in FIGS. 6-7 illustrate exemplary user interfaces that may be used to access and otherwise use various indexes that the reader device 102 is capable of referencing.

As is illustrated in FIG. 6, the display 602 includes an eBook indexes screen 604 rendered thereon. The eBook indexes screen 604 is rendered on the display 602 when an eBook indexes button 606 is depressed. The eBook indexes button 606 is touch screen implemented in this example. The eBook indexes screen 604 includes five user selectable categories. These categories include touch screen implemented buttons labeled title only index 608, recent search indexes 610, common search indexes 612, user saved search indexes 614, and local/remote search 616. A user may select one of the buttons 608-616 to cause another screen rendering on the display 602. An example of this is illustrated in FIG. 7.

The eBook reader device 102 also includes several additional touch screen implemented buttons labeled logon 618, eBook titles 620, title refresh 622, eBook display 624 and editing tools 626. Depressing the logon button 618 initiates a logon screen that will accept user logon information. Properly logging on through such a screen allows a user to save user specific information in storage of the eBook reader device 102. Use of the eBooks titles button 620 will show a screen that lists titles of complete eBooks stored in the complete eBook section 124. If eBook/book summaries are also stored in the section 124, those titles will also be shown on the screen.

The title refresh button 622 may be used to initiate wireless or other means of communication with the content repository 104. Once a connection is established with the content repository 104, a downloading and/or uploading process may commence. For example, the title only index 116 may be refreshed; metadata may be retrieved and associated with the recent search indexes 118, the common search indexes 120 and/or the user saved search indexes 122. The content repository 104 may also use this connection opportunity to retrieve one or more recent search indexes, common search indexes and/or user specific indexes and save them in the storage 126.

Other information exchanges may also occur during the wireless or other communication session established between the eBook reader device 102 and the content repository 104.

The eBook display button 624 is used to display pages of an eBook loaded in the immediate page memory 606. Generally, the button 624 allows a user of the eBook reader device 102 to return to a current eBook being read regardless of a screen displayed on the display 602. The editing tools button 626 is used to access eBook annotation, commenting and editing tools that may part of the reader device's 102 operating system. The reader device 102 also includes a previous page button 628, an on/off button 630, and a next page button 634. The buttons 628 and 630 may be used to "turn" pages of an eBook displayed on the reader device 102. The options button 632, referenced previously, may be used to alter various operating parameters of the reader device 102 (e.g., display contrast, power control functions, etc.).

FIG. 7 illustrates a title only index screen 702 that appears after a user has selected the title only index button 608. The title only index screen 702 is the graphical user interface to the title only index 116 stored in the device memory 112. The title only index screen 702 may also provide an interface to the title index 128 of the content repository 104. Connection with the title index 128 may occur automatically if the eBook reader device 102 is wirelessly (or by other means) connected with the content repository 104. Alternatively, once the title only index button 608 is selected, the eBook reader device 102 graphically inquires if connection with the content repository 104 is desired. For example, the graphical user interface may display a dialog box asking if a wireless connection, or another communications connection, with the content repository 104 is desired.

The title only index screen 702 allows users of the eBook reader device 102 to search and browse titles included in the title only index 116 and/or the title index 128. The screen includes a search field 704 that is capable of receiving keywords related to a topic of interest. Using these keywords, the title only index 116 and/or the title index 128 are searched. Titles matching the entered keywords are shown in a results section 706.

A receive additional information button 708 is included as part of the title only index screen 702. If a wireless (or other) connection is not already active, actuation of the button 708 initiates the eBook reader device 102 to connect wirelessly (or by other means) with the content repository 104. A user of the reader device 102 may highlight various titles included in the results section 706 and request additional information regarding those titles selected using the button 708. Such additional information may include retrieving metadata associated with selected titles, retrieving summaries, or initiating a purchase of one or more of the selected titles. Title searches may be saved in the storage 126 of the content repository 104 and/or in the device memory 112 of the reader device 102.

Figure 8:
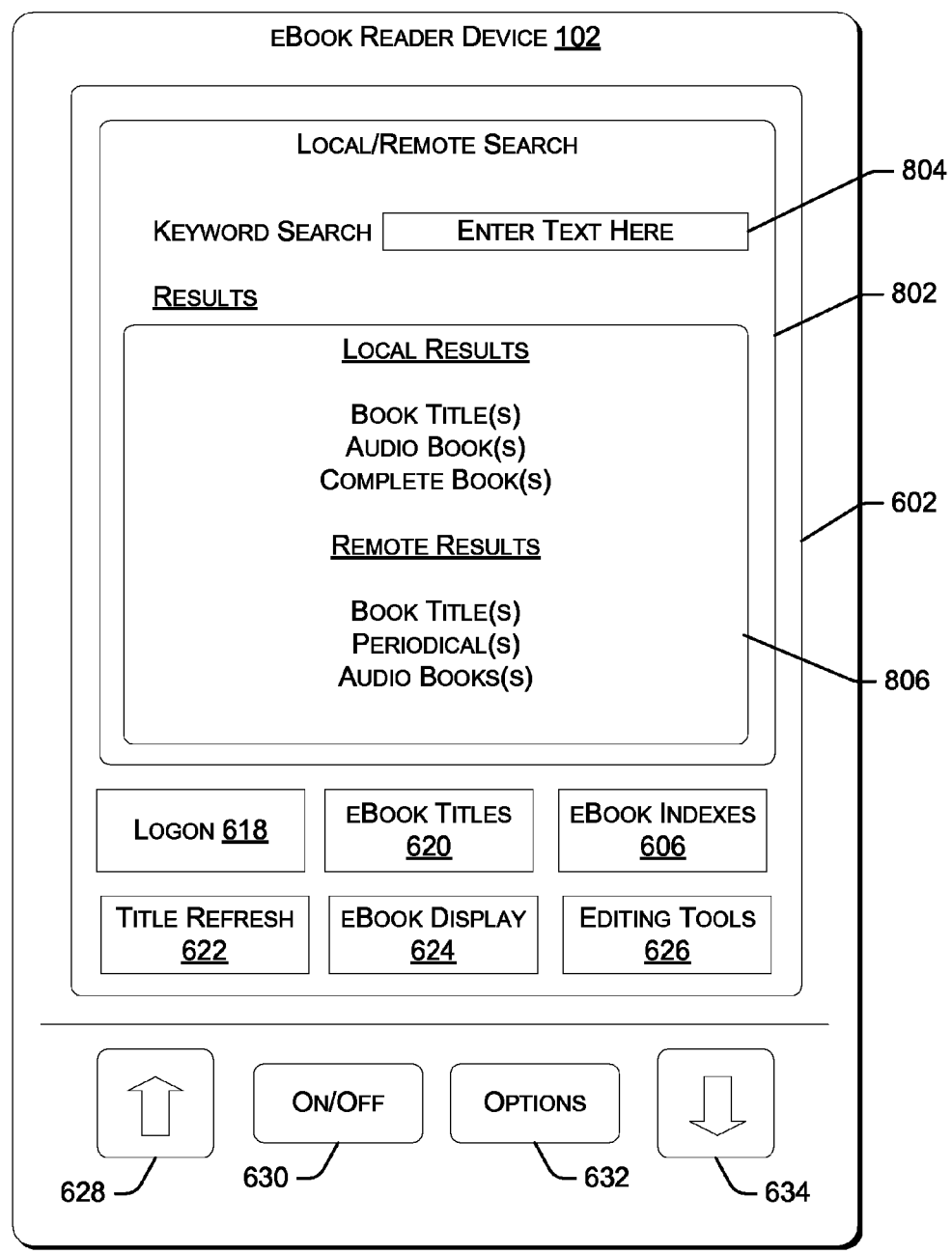
FIG. 8 illustrates a local/remote search screen rendered on an eBook reader device. In this illustration, the local/remote search screen is linked to content stored in an eBook reader device and content stored at a remote content repository.

FIG. 8 illustrates a local/remote search screen 802 that appears after a user has selected the local/remote button 606. The local/remote search screen 802 is a graphical user interface that may be used to search indexes and content stored in the device memory 112. The local/remote search screen 802 also provides an interface that may be used to search indexes and content stored in the content repository 104. Searching indexes and content stored in the repository 104 may occur automatically if the eBook reader device 102 is wirelessly (or by other means) connected with the content repository 104. Alternatively, once the local/remote button 606 is selected, the eBook reader device 102 may graphically inquire if connection with the content repository 104 is desired. For example, the graphical user interface may display a dialog box asking if a wireless (or other) connection with the content repository 104 is desired. Note that even if a wireless (or other) connection is not established, local search of content stored in the eBook reader device 102 is still enabled.

The local/remote search screen 802 allows users of the eBook reader device 102 to search and browse content stored both locally in the device 102 and/or remotely in the content repository 104. The screen includes a search field 804 that is capable of receiving keywords related to a topic of interest. Using these keywords, the content stored both locally in the device 102 and/or remotely in the content repository 104 are searched. Content matching the entered keywords are shown in a results section 806.

In one exemplary implementation, the results section 806 displays content in categories. One category lists content that is found locally in the eBook reader device 102 and another category lists content that is found remotely in the content repository 104. The user of the device 102 may select one or more of the returned results and appropriate information will be displayed. Selection of search results returned from the content repository 104 may necessitate submission of payment information before content is fully retrievable from the repository 104.

Although not illustrated in the figures, selection of the various other buttons discussed in the foregoing may cause the eBook reader device 102 to display a range of other types of graphical user interfaces on the display 602. For example, to name a few, the reader device 102 may be implemented with graphical user interfaces that enable users to play music, watch video content, and/or browse the Internet.

Exemplary Processes

FIGS. 9-13 illustrate example processes related to operation of an eBook reader device. Each process is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and in general, number of the described blocks can be combined in any order and/or in parallel to implement the process.

For discussion purposes, the example processes of FIGS. 9-13 are described with reference to the eBook reader device 102 and the content repository 104. In particular, the acts described below may be implemented and performed by the eBook reader device 102 and the content repository 104.

Figure 9:
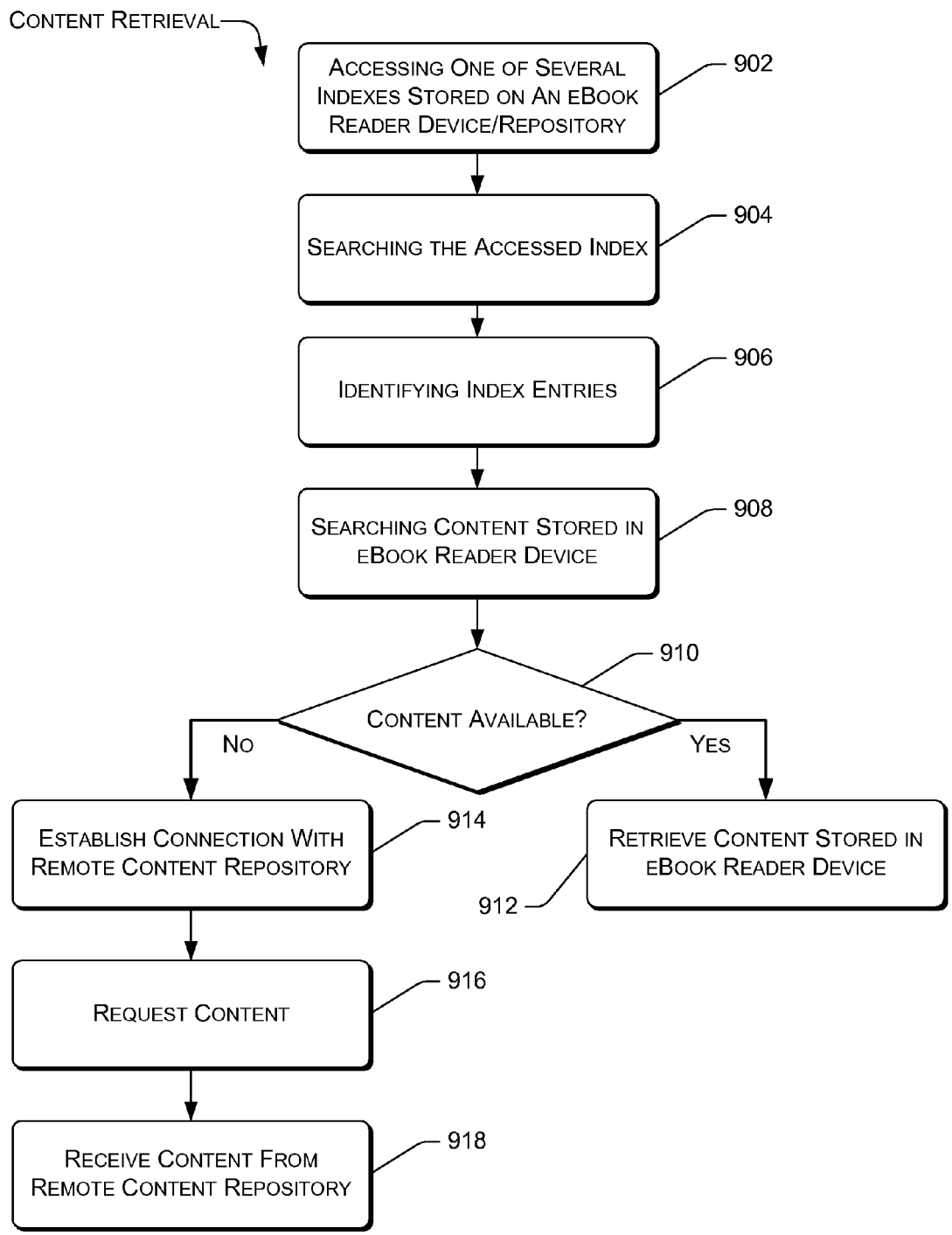
FIG. 9 is a flow diagram of a process for retrieving eBook reader device content from a remote content repository or memory of the eBook reader device.

FIG. 9 illustrates a process that occurs when a user of the eBook reader device 102 accesses content stored in the device memory 112. The process illustrated in FIG. 9 also applies to accessing content of the content repository 104. This may occur when the reader device 102 is wirelessly (or by other means) connected with the content repository 104. More specifically, when a wireless (or other) connection is active, or if a wireless (or other) connection is established with the repository 104, content stored in the device memory 112 and the repository 104 may be accessed and searched simultaneously. This enables the eBook reader device 102 to display the results of searches on both content stored locally and content stored in the repository 104.

At block 902, one of several indexes stored in the device memory 112 is accessed. For example, the reader device 102 may access the title only index 116, the recent search indexes 118, or the common search indexes 122. Other indexes may be accessed if they are stored in the reader device 102. At block 904, the accessed index is searched. In one implementation, the index is searched using one or more keywords. The one or more keywords may be input into the reader device 102 using a user interface. Exemplary user interfaces are discussed in connection with FIGS. 6-8.

At block 906, index entries that relate to the keywords are identified. Depending on the index searched, the identified index entries may be title only index entries and/or metadata index entries. The block 906 may also include a process that detects direct user input actively selecting index entries that relate to the search keywords. Allowing a user to select index entries that relate to the search keywords may serve to narrow or reduce the number of index entries used when the device memory 112 is searched for eBook content. At block 908, the eBook reader device 102 searches the device memory 112 for eBook content (e.g., metadata, summaries, complete eBooks, etc.) that relates to the identified or user selected eBook index entries. If the related eBook content is stored in the eBook reader device 102 (determined at block 910), the desired content is retrieved and displayed on the reader device 102 (block 912).

At block 914, if the eBook related content is not stored on the eBook reader device 102, a wireless (or other) connection is established with the content repository 104. The instructions of block 914 are not performed if a wireless (or other) connection is already active. At block 916, the reader device 102 requests delivery of the related content. The content repository 104 will deliver the requested related content to the reader device 102 if a billing process is not required. If charges are required before delivery of the requested content may occur, a billing process is commenced. An exemplary billing process is discussed in connection with FIG. 12. Related eBook content that would generally not require a billing process are eBook/book summaries, additional metadata and updates to the title only index 116. At block 918, the requested eBook content is received from the content repository 104.

Figure 10:
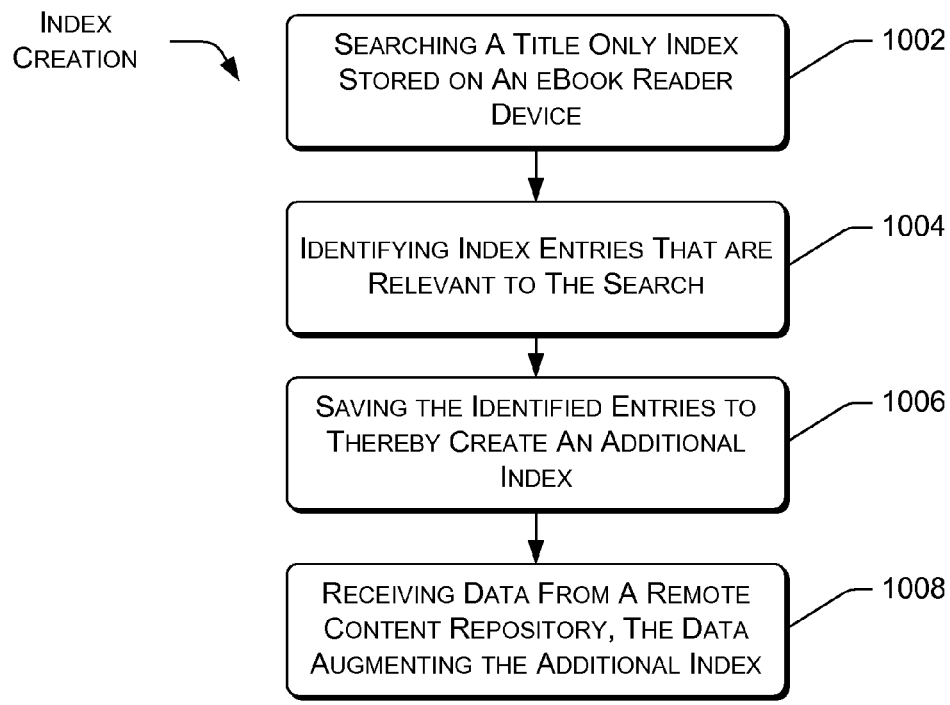
FIG. 10 is a flow diagram of a process for creating and augmenting an index stored in an eBook reader device. The index is created after searching and identifying index entries referenced in a title only index.

FIG. 10 illustrates a process for creating an index storable in the eBook reader device 102. Such an index may be stored in the device memory 112, and more particularly, included in the eBook indexes 114. At block 1002, the title only index 116 in the device memory 112 is searched. The search may be conducted using one or more keywords entered by a user of the eBook reader device 102. If a wireless session (or other communication session) is currently established with the content repository 104, the title index 128 may be searched as well, or instead of searching the title only index 116.

At block 1004, index entries that result from a search based on the keywords are identified. Depending on the index searched, the identified index entries may be title only index entries and/or metadata index entries. At block 1006, the identified index entries are saved as a group to create an additional index. The created additional index may be saved in one of the indexes 116-120. The additional index may also be saved in the user title indexes 130 located in the content repository 104.

At block 1008, additional data may be received from the content repository 104. For example, additional data may be delivered to augment the index entries now associated with the created additional index. Such additional data may include metadata related to the index entries included in the additional index, or one or more eBook summaries related to the index entries. Delivery of the additional data may be requested by a user of the eBook reader device 102. Delivery of the additional data may also be directed by the content repository 104. For example, the additional data may be delivered automatically in accordance with a defined communications schedule between the reader device 102 and the repository 104.

Figure 11:
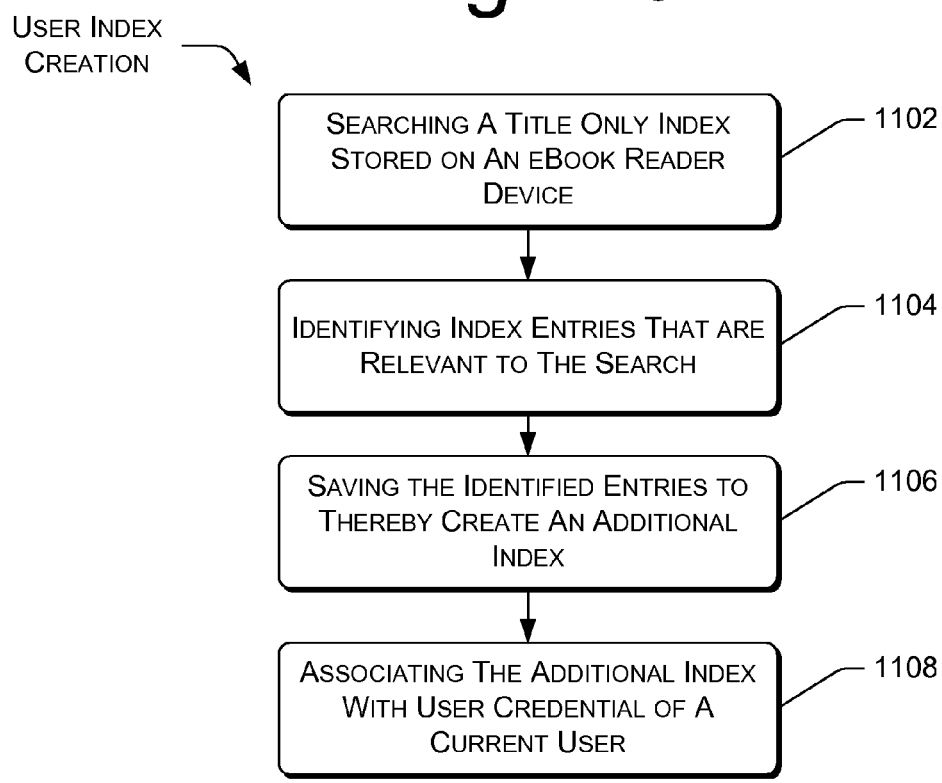
FIG. 11 is a flow diagram of a process for creating a user specific index stored in an eBook reader device. The index is created after searching and identifying index entries referenced in a title only index.

FIG. 11 illustrates a process for creating a user specific index storable in the eBook reader device 102. Generally, the process illustrated in the figure is designed to create indexes that are associated with unique user credentials. In one implementation of the eBook reader device 102, the user specific indexes are stored in the user saved search indexes 122 of the device memory 112.

At block 1102, the title only index 116 in the device memory 112 is searched. The search may be conducted using one or more keywords entered by a user of the eBook reader device 102. If a wireless session (or other communication session) is currently established with the content repository 104, the title index 128 may be searched as well, or instead of searching the title only index 116.

At block 1104, index entries that result from a search based on the keywords are identified. Depending on the index searched, the identified index entries may be title only index entries and/or metadata index entries. At block 1106, the identified index entries are saved as a group to create a user specific index. The created additional index may be saved and included in the user saved search indexes 122. The user specific index may also be saved in the user title indexes 130 located in the content repository 104. At block 1108, the user specific index is associated with the user credentials of a current user of the eBook reader device 102. This association limits access to the user specific index. More specifically, only those users that possess the proper logon username and password of the current user will be able to gain access to the created user specific index.

Additional data may be delivered to augment the index entries associated with the created user specific index. Such additional data may include metadata related to the index entries included in the user specific index, or one or more eBook/book summaries related to the index entries. Delivery of the additional data may be requested by a user of the eBook reader device 102. Delivery of the additional data may also be directed by the content repository 104. For example, the additional data may be delivered automatically in accordance with a defined communications schedule between the reader device 102 and the repository 104.

Figure 12:
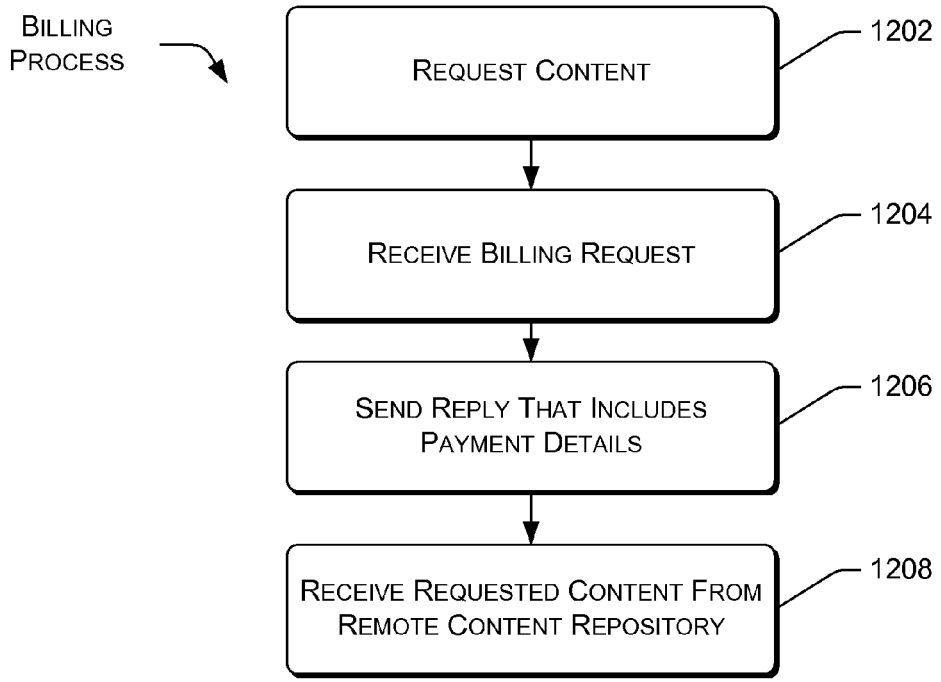
FIG. 12 is a flow diagram of a process for performing a billing function in response to a content request by an eBook reader device.

FIG. 12 illustrates a billing process that may be used when content is requested from the content repository 104. At block 1202, an eBook content request is received by the content repository 104. The request was originated by the eBook reader device 102. The eBook content request may include a request for one or more eBooks available for purchase in the content repository 104. However, the request may also be for other content stored in the content repository 104.

At block 1204, the eBook reader device 102 receives a billing request from the content repository 104. A billing request is sent to the reader device 102 when requested content has associated fees and payment of those fees is required before delivery and/or download of the content may commence. As is discussed herein, some content available at the content repository 104 may not have associated fees (e.g., eBook titles, metadata, some or all eBook summaries, etc.).

At block 1206, the reader device 102 sends a reply that includes payment information. The payment information may include credit card information, bank account information, etc. Generally, any conventional manner of completing payment between various sources may be used in block 1206. Including, for example, payment by means of a previously established account with a provider of one or more of the eBook services described herein. At block 1208, the content requested in block 1202 is received by the eBook reader device 102. This may be by direct download by the eBook reader device 102, background download, or delivery during a later wireless (or other communication) session with the content repository 104. Moreover, content obtained by the reader device 102 may occur during one contiguous wireless (or other communication) session, or over multiple sessions.

The billing process illustrated in FIG. 12 may not be required if a user of the eBook reader device 102 has established a subscription based billing arrangement with a proprietor of the content repository 104. If this is the case, the billing process may be required only under special circumstances. For example, if requested content is not included as part of the subscription agreement.

Figure 13:
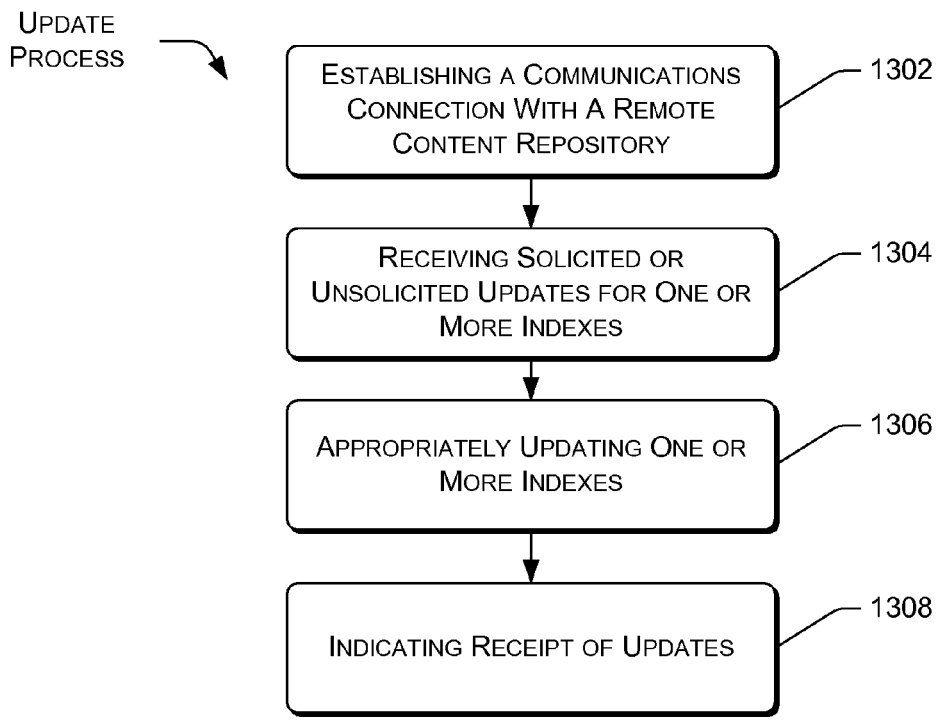
FIG. 13 is a flow diagram of a process for updating an index stored in an eBook reader device. An index update may be a solicited or unsolicited index update delivered by a remote content repository.

FIG. 13 illustrates an update process that may be used to update content stored in the eBook reader device 102. At block 1302, a wireless (or other communication) session is established with the content repository 104. The wireless (or other communication) session may be established by the reader device 102 or the content repository 104. At block 1304, unsolicited and/or solicited updates for one or more indexes are received by the reader device 102. The updates may include additional index entries for the various indexes stored in the eBook indexes 114. The updates may also include recommendations and promotional offers generated based on indexes stored in the user title indexes 130 of the content repository 104. For example, methods may be in place at the content repository 104 that are designed to analyze users' search indexes and purchase history indexes. This type of analysis may tailor the type and frequency of the updates delivered by the content repository 104.

At block 1306, the eBook reader device 102 processes the received updates and appropriately updates one or more indexes stored in the eBook indexes 114. At block 1308, if the reader device 102 is designed to do so, a message indicating receipt of the updates is sent to the content repository 104.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method of accessing content for an electronic reader device, comprising:
    displaying on the electronic reader device, user-selectable categories each associated with a respective index of a set of indexes stored on the electronic reader device, the set of indexes comprising:
        a title only index comprising index entries related to titles of electronic books that are offered on a remote content repository; and
        a search index comprising one or more or:
            a recent search index comprising keyword searches recently performed by the electronic reader device:
            a common search index comprising keyword searches commonly performed by the electronic reader device: and
            a user saved search index comprising keyword searches performed by electronic reader device and saved by user request;
    receiving a selection of one of the user-selectable categories and, in response, accessing the associated index including an index entry also stored in the remote content repository;
    sending information regarding the search index stored on the electronic reader device to the remote content repository; and
    receiving an update to an index of the set of indexes stored on the electronic reader device at least partly in response to the sending, the update being generated for the electronic reader device based at least in part on the information regarding the search index.

2. The method as recited in claim 1, further comprising receiving index entries from the remote content repository, the index entries augmenting an index stored in the electronic reader device.

3. The method as recited in claim 2, wherein the received index entries are a subset of index entries stored in an index held by the remote content repository.

4. The method of claim 1, wherein the user interface is divided into sections corresponding to the selected content storage locations, and the mapped search results are displayed in different individual sections of the user interface that correspond to individual selected content storage locations from which the mapped search results are received.

5. The method as recited in claim 4, wherein the identified titles relate to both electronic content and printed content.

6. The method as recited in claim 1, wherein at least one index stored in the electronic reader device includes index entries that are comprised of metadata.

7. The method as recited in claim 6, wherein the metadata includes a category and associated value related to content.

8. The method as recited in claim 7, wherein the category includes at least one of title, contributor, publisher, publishing data, International Standard Book Number, page count, abstract and file size.

9. The method as recited in claim 1, further comprising receiving an update for an index stored in the electronic reader device through communication with the remote content repository.

10. The method as recited in claim 1, further comprising receiving an update for an index stored in the electronic reader device, the update including a title index entry for inclusion in the title only index.

11. The method as recited in claim 1, further comprising sending search related information to the remote content repository.

12. The method as recited in claim 11, wherein the search related information is a set of content information assembled from one or more searches of an index stored on the electronic reader device.

13. The method as recited in claim 12, wherein the set of content information includes content titles.

14. The method as recited in claim 1, further comprising receiving multiple indexes from the remote content repository, wherein each of the multiple indexes is substantially unique when compared to another of the received multiple indexes.

15. The method as recited in claim 14, wherein one of the received multiple indexes includes title entries and another of the received multiple indexes includes content metadata.

16. The method as recited in claim 14, wherein one of the received multiple indexes includes index entries that result from a keyword search performed using the electronic reader device.

17. The method as recited in claim 14, wherein one of the received multiple indexes includes index entries related to a plurality of keyword searches performed using the electronic reader device.

18. The method as recited in claim 1, further comprising receiving from the remote content repository an electronic book summary that is readable using the electronic reader device.

19. An article of manufacture for use in programming a processor, the article of manufacture comprising at least one computer readable storage device including at least one computer program embedded therein that causes the processor to perform the method of claim 1.

20. A non-transitory computer-usable storage medium having computer readable instructions stored thereon for execution by one or more processors to perform the method of claim 1.

21. The method as recited in claim 1, wherein the electronic reader device is an electronic book reader device.

22. An electronic book reader device, comprising: one or more memories;
   a display capable of displaying content stored in the one or more memories; and
   one or more processors capable of accessing content stored in the one or more memories;
   wherein the one or more memories store computer-executable instructions that, when executed, cause the one or more processors to perform acts comprising:
      displaying, on the electronic book reader device, user-selectable categories each associated with a respective index of a set of indexes stored on the electronic book reader device, the set of indexes comprising:
      a title only index comprising index entries related to titles of content that are offered on a remote content repository;
      a search index comprising one or more of:
      a recent search index comprising keyword searches recently performed by the electronic book reader device;
      a common search index comprising keyword searches commonly performed by the electronic book reader device; and
      a user saved search index comprising keyword searches performed by the electronic book reader device and saved by user request;
   receiving a selection of one of the user-selectable categories and, in response, accessing the associated index of the set of indexes stored in the electronic book reader device, the associated index including an index entry also stored in the remote content repository;
   sending information regarding the search index stored on the electronic book reader device to the remote content repository; and
   receiving an update to an index of the set of indexes stored on the electronic book reader device at least partly in response to the sending, the update being generated for the electronic book reader device based at least in part on the information regarding the search index.

23. The electronic book reader device as recited in claim 22, wherein the recent search index, the common search index and the user saved search index are accessible using user logon credentials stored in the electronic book reader device.

24. The electronic book reader device as recited in claim 22, further comprising a user access module implemented in the one or more memories, the user access module maintaining and facilitating use of user logon credentials and the recent search index, the common search index and the user saved search index associated with the user logon credentials.

25. The electronic book reader device as recited in claim 24, wherein the user logon credentials each include a username and an associated password.

26. The electronic book reader device as recited in claim 24, wherein the user logon credentials each include biometric information associated with a user of the electronic book reader device.

27. The electronic book reader device as recited in claim 22, further comprising wireless capability capable of communicating with a remote content repository containing at least electronic books available for retrieval.

28. The electronic book reader device as recited in claim 22, wherein at least one index stored in the electronic book reader device includes index entries that are comprised of metadata, and wherein the metadata includes categories and associated values related to books.

29. The electronic book reader device as recited in claim 28, wherein the categories include at least title, contributor, and abstract.

30. The electronic book reader device as recited in claim 22, wherein the one or more memories include one or more electronic books stored therein.

31. The electronic book reader device as recited in claim 22, wherein the one or more memories are non-volatile or volatile memory, or a combination of both non-volatile and volatile memory.

32. One or more non-transitory computer-readable media storing computer-executable instructions that, when executed, cause one or more processors to perform acts comprising:
   displaying, on an electronic reader device, user-selectable categories each associated with a respective index of a set of indexes stored on the electronic reader device, the set of indexes comprising:
      a title only index comprising index entries related to titles of content that are offered on a remote content repository;
      a search index comprising one or more of:
      a recent search index comprising keyword searches recently performed by the electronic reader device;
      a common search index comprising keyword searches commonly performed by the electronic reader device; and
      a user saved search index comprising keyword searches performed by the electronic reader device and saved by user request;
   receiving a selection of one of the user-selectable categories and, in response, accessing the associated index of the set of indexes stored in the electronic reader device, the associated index including an index entry also stored in the remote content repository;
   sending information regarding the search index stored on the electronic reader device to the remote content repository; and
   receiving an update to an index of the set of indexes stored on the electronic reader device at least partly in response to the sending, the update being generated for the electronic reader device based at least in part on the information regarding the search index.

33. The method as recited in claim 1, wherein receiving an update to an index comprises receiving an update to the title only index stored on the electronic reader device, the update comprising a title of an electronic book associated with the information regarding the search index.

34. The method as recited in claim 1, further comprising receiving a promotional offer for an electronic book offered by the remote content repository at least partly in response to the sending of the information regarding the search index.

35. The method as recited in claim 1, further comprising receiving a recommendation for an electronic book offered by the remote content repository at least partly in response to the sending of the information regarding the search index.

* * * * *